US012223262B1

(12) United States Patent
Rozenfeld et al.

(10) Patent No.: US 12,223,262 B1
(45) Date of Patent: Feb. 11, 2025

(54) EXPRESSIONS MANAGEMENT SERVICE FOR DATA SHEET-BASED APPLICATIONS

(71) Applicant: Amazon Technologies, Inc., Seattle, WA (US)

(72) Inventors: Joseph Rozenfeld, San Carlos, CA (US); Stephen Brodsky, Los Gatos, CA (US); Robin Alan Golden, Los Gatos, CA (US); Aaron-Kenneth Karl Rehaag, Vancouver (CA); Shuki Binyamin, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 16/367,092

(22) Filed: Mar. 27, 2019

(51) Int. Cl.
*G06F 40/18* (2020.01)
*H04L 67/75* (2022.01)

(52) U.S. Cl.
CPC .............. *G06F 40/18* (2020.01); *H04L 67/75* (2022.05)

(58) Field of Classification Search
CPC ....... G06F 40/18; G06F 16/2282; H04L 67/75
USPC ........................................................ 715/220
See application file for complete search history.

(56) References Cited

U.S. PATENT DOCUMENTS

| 5,187,788 | A |   | 2/1993  | Marmelstein |  |
|-----------|---|---|---------|-------------|--|
| 5,255,356 | A |   | 10/1993 | Michelman et al. |  |
| 5,255,363 | A | * | 10/1993 | Seyler .................... | G06F 3/0489 715/219 |
| 5,371,675 | A |   | 12/1994 | Greif et al. |  |
| 5,396,587 | A | * | 3/1995  | Reed ........................ | G06F 40/18 715/219 |
| 5,481,692 | A | * | 1/1996  | Ryu .......................... | G06F 8/00 719/331 |
| 5,499,371 | A |   | 3/1996  | Henninger et al. |  |
| 5,504,848 | A | * | 4/1996  | Yamada .................. | G06F 40/18 715/205 |
| 5,553,215 | A | * | 9/1996  | Kaethler ................. | G06F 40/18 715/219 |
| 5,603,021 | A | * | 2/1997  | Spencer .................. | G06F 40/18 |
| 5,604,854 | A |   | 2/1997  | Glassey |  |
| 5,708,827 | A | * | 1/1998  | Kaneko .................... | G06F 40/18 715/219 |
| 5,893,123 | A | * | 4/1999  | Tuinenga ................ | G06F 40/18 715/209 |
| 6,157,934 | A |   | 12/2000 | Khan et al. |  |

(Continued)

FOREIGN PATENT DOCUMENTS

JP   2006325047   11/2006

OTHER PUBLICATIONS

Sestoft, P.,"Implementing Function Spreadsheets," 2008, ACM, pp. 91-94. (Year: 2008).*

(Continued)

*Primary Examiner* — Chau T Nguyen
(74) *Attorney, Agent, or Firm* — Robert C. Kowert; Kowert, Hood, Muynon, Rankin & Goetzel, P.C.

(57) ABSTRACT

A unique identifier of an expression which refers to a cell of a data sheet is stored in a repository. In an application comprising an operation based on evaluating the expression, the expression is indicated by the unique identifier. In response to detecting a write directed to the cell, a modified version of contents of the cell is stored without re-evaluating the expression. The expression is re-evaluated in response to determining that the operation of the application is to be implemented.

19 Claims, 11 Drawing Sheets

(56) References Cited

U.S. PATENT DOCUMENTS

| | | | |
|---|---|---|---|
| 6,269,473 B1 | 7/2001 | Freed et al. | |
| 6,490,600 B1* | 12/2002 | McGarry | G06F 40/18 715/201 |
| 6,601,234 B1 | 7/2003 | Bowman-Amuah | |
| 6,631,497 B1 | 10/2003 | Jamshidi et al. | |
| 6,691,281 B1* | 2/2004 | Sorge | G06F 40/123 715/234 |
| 6,742,175 B1 | 5/2004 | Brassard | |
| 6,877,155 B1 | 4/2005 | Lindsey | |
| 6,901,579 B1 | 5/2005 | Suguta | |
| 6,988,241 B1 | 1/2006 | Guttman et al. | |
| 7,032,210 B2 | 4/2006 | Alloing et al. | |
| 7,047,518 B2 | 5/2006 | Little et al. | |
| 7,069,499 B1* | 6/2006 | McGarry | G06Q 10/06 715/201 |
| 7,225,189 B1 | 5/2007 | McCormack et al. | |
| 7,404,176 B2 | 7/2008 | Reeder et al. | |
| 7,404,177 B1 | 7/2008 | Greenfield et al. | |
| 7,941,438 B2 | 5/2011 | Molina-Moreno et al. | |
| 8,146,000 B1 | 3/2012 | Boliek et al. | |
| 8,209,661 B2* | 6/2012 | Smialek | G06F 8/30 715/219 |
| 8,327,351 B2 | 12/2012 | Paladino et al. | |
| 8,407,668 B2* | 3/2013 | Lindhorst | G06F 40/18 717/115 |
| 8,812,625 B1 | 8/2014 | Chitilian et al. | |
| 8,938,726 B2 | 1/2015 | Barak | |
| 9,053,083 B2 | 6/2015 | Waldman et al. | |
| 9,389,891 B2* | 7/2016 | Battagin | G06F 40/18 |
| 9,710,429 B1 | 7/2017 | Raghunath | |
| 9,734,139 B2* | 8/2017 | Reeves | G06F 40/197 |
| 9,798,889 B1 | 10/2017 | Karpel et al. | |
| 10,073,844 B1 | 9/2018 | Grzech et al. | |
| 10,191,897 B1* | 1/2019 | Olkin | G06F 40/18 |
| 10,489,214 B2 | 11/2019 | Joseph | |
| 10,699,067 B2* | 6/2020 | Hurley | G06F 40/186 |
| 10,705,805 B1 | 7/2020 | Boswarth et al. | |
| 10,740,550 B1 | 8/2020 | Bosworth et al. | |
| 10,846,469 B2* | 11/2020 | Sobhy Deraz | G06F 9/543 |
| 10,877,735 B1 | 12/2020 | Buck et al. | |
| 11,063,925 B1 | 7/2021 | Vera et al. | |
| 11,340,893 B2 | 5/2022 | Trevathan | |
| 11,397,565 B2 | 7/2022 | Buck et al. | |
| 11,740,877 B2 | 8/2023 | Bosworth et al. | |
| 2001/0032248 A1* | 10/2001 | Krafchin | G06Q 10/107 709/206 |
| 2002/0032901 A1 | 3/2002 | Chessin | |
| 2002/0065846 A1 | 5/2002 | Ogawa et al. | |
| 2002/0091990 A1 | 7/2002 | Little et al. | |
| 2002/0133368 A1 | 9/2002 | Strutt et al. | |
| 2003/0106040 A1* | 6/2003 | Rubin | G06F 16/00 717/106 |
| 2003/0110191 A1* | 6/2003 | Handsaker | G06F 40/18 715/212 |
| 2003/0110472 A1 | 6/2003 | Alloing et al. | |
| 2003/0144886 A1* | 7/2003 | Taira | G16H 70/60 705/3 |
| 2004/0015368 A1 | 1/2004 | Potter et al. | |
| 2004/0233232 A1 | 11/2004 | Iborra et al. | |
| 2005/0039114 A1* | 2/2005 | Naimat | G06F 40/18 715/213 |
| 2005/0044496 A1* | 2/2005 | Kotler | G06F 40/18 715/225 |
| 2005/0081141 A1* | 4/2005 | Jonsson | G06F 40/18 717/116 |
| 2005/0097448 A1* | 5/2005 | Giannetti | G06F 40/174 715/245 |
| 2005/0120290 A1* | 6/2005 | Mistry | H04N 1/32128 715/272 |
| 2005/0257196 A1 | 11/2005 | Hollander et al. | |
| 2006/0015805 A1 | 1/2006 | Humenansky et al. | |
| 2006/0026503 A1 | 2/2006 | Bartosh | |
| 2006/0041543 A1 | 2/2006 | Achlioptas | |
| 2006/0069696 A1 | 3/2006 | Becker et al. | |
| 2006/0136534 A1* | 6/2006 | Boon | G06F 40/18 708/200 |
| 2006/0149740 A1 | 7/2006 | Tsutazawa et al. | |
| 2006/0200748 A1 | 9/2006 | Shenfield | |
| 2006/0224946 A1* | 10/2006 | Barrett | G06F 40/18 715/210 |
| 2007/0016650 A1 | 1/2007 | Gilbert et al. | |
| 2007/0033519 A1* | 2/2007 | Zdenek | G06F 40/18 715/234 |
| 2007/0130511 A1 | 6/2007 | Roberge et al. | |
| 2007/0136666 A1 | 6/2007 | Khen et al. | |
| 2007/0220415 A1* | 9/2007 | Cheng | G06F 15/00 715/212 |
| 2007/0244672 A1* | 10/2007 | Kjaer | G06F 40/18 703/2 |
| 2008/0005658 A1 | 1/2008 | Benhase et al. | |
| 2008/0162532 A1 | 7/2008 | Daga | |
| 2008/0270561 A1 | 10/2008 | Tang et al. | |
| 2008/0270980 A1* | 10/2008 | Ahadian | G06F 8/34 717/109 |
| 2008/0275910 A1 | 11/2008 | Molina-Moreno et al. | |
| 2008/0288301 A1* | 11/2008 | Emling | G06F 16/168 705/4 |
| 2009/0006842 A1* | 1/2009 | Ross | H04L 63/12 713/155 |
| 2009/0006939 A1 | 1/2009 | DeSpain et al. | |
| 2009/0030944 A1* | 1/2009 | Ni | G06F 8/24 |
| 2009/0037873 A1* | 2/2009 | Ahadian | G06F 8/33 717/105 |
| 2009/0044091 A1 | 2/2009 | Gur | |
| 2009/0070412 A1 | 3/2009 | D'Angelo et al. | |
| 2009/0118846 A1 | 5/2009 | Eldridge | |
| 2009/0313245 A1 | 12/2009 | Weyl et al. | |
| 2010/0169759 A1 | 7/2010 | Le Brazidec et al. | |
| 2010/0250497 A1 | 9/2010 | Redlich et al. | |
| 2010/0313119 A1* | 12/2010 | Baldwin | G06F 3/04842 715/256 |
| 2011/0087954 A1* | 4/2011 | Dickerman | G06F 40/18 715/219 |
| 2011/0113424 A1 | 5/2011 | Ewington et al. | |
| 2011/0209133 A1 | 8/2011 | Mahajan et al. | |
| 2012/0110001 A1* | 5/2012 | Young | G06F 40/18 707/769 |
| 2012/0265758 A1 | 10/2012 | Han et al. | |
| 2013/0013993 A1 | 1/2013 | Oh | |
| 2013/0055058 A1* | 2/2013 | Leong | G06F 40/18 715/219 |
| 2013/0080887 A1 | 3/2013 | Hou | |
| 2013/0086064 A1* | 4/2013 | Salch | G06F 40/18 707/E17.014 |
| 2013/0117651 A1 | 5/2013 | Waldman et al. | |
| 2013/0159832 A1* | 6/2013 | Ingargiola | G06F 40/18 715/220 |
| 2013/0262986 A1 | 10/2013 | Leblond | |
| 2013/0290822 A1* | 10/2013 | Chen | G06F 40/186 715/212 |
| 2014/0136936 A1 | 5/2014 | Patel et al. | |
| 2014/0157098 A1 | 6/2014 | Maresca | |
| 2014/0164895 A1 | 6/2014 | Matheson et al. | |
| 2015/0040104 A1 | 2/2015 | Mall et al. | |
| 2015/0089344 A1 | 3/2015 | Pickering et al. | |
| 2015/0106782 A1* | 4/2015 | Tuvian | G06F 8/76 717/104 |
| 2015/0142740 A1 | 5/2015 | Behuria et al. | |
| 2015/0169532 A1* | 6/2015 | Otero | G06F 40/18 715/212 |
| 2015/0242199 A1 | 8/2015 | Goldstein | |
| 2016/0041963 A1 | 2/2016 | Coblenz et al. | |
| 2016/0055139 A1 | 2/2016 | Creason et al. | |
| 2016/0142488 A1* | 5/2016 | Adler | G06F 40/18 709/217 |
| 2016/0342582 A1* | 11/2016 | Hiatt | G06T 11/206 |
| 2017/0032279 A1 | 2/2017 | Miserendino et al. | |
| 2017/0098008 A1 | 4/2017 | Kemmer | |
| 2017/0177621 A1 | 6/2017 | Cardonha et al. | |
| 2017/0178002 A1 | 6/2017 | Moriarty et al. | |
| 2017/0255596 A1 | 9/2017 | Rochelle et al. | |

(56) References Cited

U.S. PATENT DOCUMENTS

| | | | |
|---|---|---|---|
| 2017/0331915 | A1 | 11/2017 | Jann et al. |
| 2017/0337233 | A1 | 11/2017 | Fawcett et al. |
| 2017/0344901 | A1 | 11/2017 | Ronen |
| 2017/0357628 | A1* | 12/2017 | Hurley ................ G06F 3/04847 |
| 2018/0014076 | A1 | 1/2018 | Shanson et al. |
| 2018/0014077 | A1 | 1/2018 | Hou et al. |
| 2018/0025161 | A1 | 1/2018 | Gauthier et al. |
| 2018/0068666 | A1 | 3/2018 | Riedmiller et al. |
| 2018/0107671 | A1 | 4/2018 | Plenos et al. |
| 2018/0157467 | A1* | 6/2018 | Stachura ................ G06F 8/34 |
| 2018/0157468 | A1* | 6/2018 | Stachura ................ G06F 40/18 |
| 2018/0173510 | A1 | 6/2018 | Koshkin |
| 2018/0181378 | A1 | 6/2018 | Bakman |
| 2018/0242038 | A1 | 8/2018 | Harper et al. |
| 2018/0260373 | A1* | 9/2018 | Sobhy Deraz .......... G06F 9/449 |
| 2018/0349134 | A1* | 12/2018 | Studer ........................ G06F 8/71 |
| 2019/0012306 | A1* | 1/2019 | Dvorak ................ G06F 40/18 |
| 2019/0012308 | A1 | 1/2019 | Dvorak |
| 2019/0147031 | A1* | 5/2019 | Dvorak ................ G06F 40/18 715/219 |
| 2019/0250891 | A1 | 8/2019 | Kumar et al. |
| 2019/0370322 | A1* | 12/2019 | Miller, III ............... G06F 40/18 |
| 2020/0092351 | A1 | 3/2020 | Chiussi et al. |
| 2020/0334019 | A1 | 10/2020 | Bosworth et al. |
| 2020/0364400 | A1 | 11/2020 | Bosworth et al. |
| 2021/0019472 | A1 | 1/2021 | Dickerman et al. |

OTHER PUBLICATIONS

Woralak Kongdenfha, Boualem Benatallah, Julien Vayssière, Régis Saint-Paul, and Fabio Casati. 2009. Rapid development of spreadsheet-based web mashups. In Proceedings of the 18th international conference on World wide web (WWW '09). Association for Computing Machinery, New York, NY, USA, 851-860. (Year: 2009).*

Edward Benson, Amy X. Zhang, and David R. Karger. 2014. Spreadsheet driven web applications. In Proceedings of the 27th annual ACM symposium on User interface software and technology (UIST '14). Association for Computing Machinery, New York, NY, USA, 97-106. (Year: 2014).*

Chang, Kerry Shih-Ping, and Brad A. Myers. "Creating interactive web data applications with spreadsheets." In Proceedings of the 27th annual ACM symposium on User interface software and technology, pp. 87-96. 2014. (Year: 2014).*

U.S. Appl. No. 15/987,841, filed May 23, 2018, Joseph Rozenfeld et al.

U.S. Appl. No. 15/818,677, filed Nov. 20, 2017, Adam Bosworth et al.

U.S. Appl. No. 15/839,663, filed Dec. 12, 2017, Adam Bosworth et al.

Google, "IMPORTRANGE—Docs editors Help," downloaded from https://support.google.com/docs/answer/3093340 on Oct. 4, 2017, pp. 1-3.

Microsoft, "Overview of Excel tables," downloaded from https://support.office.com/en-us/article/Overview-of-Excel-tables-7ab0bb7d-3a9e-4b56-a3c9-6c94334e492c on Oct. 2, 2017, pp. 1-6.

Microsoft, "Work with hyperlinks in Excel," downloaded from https://support.office.com/en-us/article/Work-with-hyperlinks-in-Excel-7fc80d8d-68f9-482f-ab01-584c44d72b3e on Oct. 3, 2017, pp. 1-9.

Lili Mou, et al., "On End-to-End Program Generation from User Intention by Deep Neural Networks," ACM, Oct. 25, 2015, pp. 1-4.

Tao Lei, et al., "From Natural Language Specifications to Program Input Parsers," 2013, In Association for Computational Linguistics (ACL), pp. 1-10.

Joel Galenson, et al., "CodeHint: Dynamic and Interactive Synthesis of Code Snippets," ICSE'14, May 31-Jun. 7, 2014, ACM 978-1-4503-2756—May 14, 2005, pp. 653-663.

Amazon web Services, "Amazon Machine Learning, Developer Guide, Version Latest," Copyright © 2017 Amazon Web Services, Inc., pp. 1-153, downloaded Feb. 2, 2017.

"17 Top App Makers to Create Your Own Mobile App—Without a Single Line of Code!," May 16, 2017, downloaded from https://www.websitetooltester.com/en/blog/app-makers/, pp. 1-48.

Mehdi Manshadi, et al., "Integrating Programming by Example and Natural Language Programming," Copyright c 2013, Association for the Advancement of Artificial Intelligence (www.aaai.org), pp. 1-7.

Travis C. Service et al., "Anytime dynamic programming for coalition structure generation", Extended Abstract, 2010, pp. 1411-1412.

Jiang He, et al., "Adaptive User Interface Generation for Web Services", IEEE International Conference on e-Business Engineering, Aug. 14, 2020, pp. 536-539.

KP Gummadi, et al., "Measurement, modeling, and analysis of a peer-to-peer file-sharing workload", Published on 2003, SOSP'03, Oct. 19-22, 2003, Bolton Landing, New York, USA, Copyright 2003 ACM, pp. 314-329.

JA Sanchez, et al., "AGS: Introducing agents as services provided by digital libraries", Published on 1997, DL 97 Philadelphia PA, USA , Copyright 1997 ACM, pp. 75-82.

A Machiry, "Dynodroid: An input generation system for android apps", ESEC/FSE 2013: Proceedings of the 2013 9th Joint Meeting on Foundations of Software Engineering, published on 2013, pp. 224-234.

Jan S. Rellermeyer, et al., "R-OSGi: Distributed Application through Software Modularization", Springer, Published on 2001,pp. 1-20.

Sestoft, P., "Implementing Function Spreadsheets," 2008, ACM, pp. 91-94.

U.S. Appl. No. 16/913,310, filed Jul. 2, 2020, Adam Bosworth, et al.

Manolescu, et al. "Model-driven design and deployment of service-enabled web applications," 2005, pp. 1-41.

Giurgiu, et al. Calling the cloud: Enabling mobile phones as interfaces to cloud applications, 2009, pp. 1-20.

"Microsoft Excel 2013 Fundamentals Workshop," pp. 1-52, dated Mar. 3, 2015, University of Pittsburg, retrieved fromm URL: <https://www.technology,pitt.edu/sites/default/files/documents/migrated/Training/Microsoft%20Excel%202013%20Fundamentals%20Manual.pf>, 2015.

* cited by examiner

EXPRESSIONS MANAGEMENT SERVICE FOR DATA SHEET-BASED APPLICATIONS

BACKGROUND

In recent years, more and more software applications are being run using smart phones and other small-footprint devices, or in cloud-based data centers, thereby reducing the need for application owners to maintain expensive application execution environments at their own premises. As application users get accustomed to easy-to-use applications, the pressure on business organizations and governmental entities to make their products and services accessible via such applications increases. Many non-business activities, such as social gatherings and the like, are also increasingly being organized and managed using phone-based or cloud-based applications.

Large well-financed organizations may be able to hire enough programming staff to develop and maintain the applications for various target environments, or outsource the work of developing and maintaining the applications. However, for a "long tail" of relatively small organizations or individuals, the costs associated with developing full-fledged applications may sometimes be prohibitive. For any given application, several different types of programming skills may be required: for example, front-end or user interface design expertise for various types of devices expected to be used for the application, back-end or database skills, security-related expertise, networking skills and so on may all be essential.

For many small organizations, making their unique service and/or product offerings accessible via easy-to-use applications may potentially lead to substantial increases in market size and/or revenue. Some small business owners may have ideas for several different types of application and channels which they would like to try out for delivering their products or services, but may lack the full depth and breadth of programming skills typically needed to develop the applications themselves. In addition, conventional application development techniques may sometimes involve longer code-build-test-deploy cycle times, which may not work well for some types of business users who wish to try out their ideas for applications. Orchestrating the creation and deployment of robust and secure applications based on such ideas may present a non-trivial technical and logistical challenge.

Figure 1:
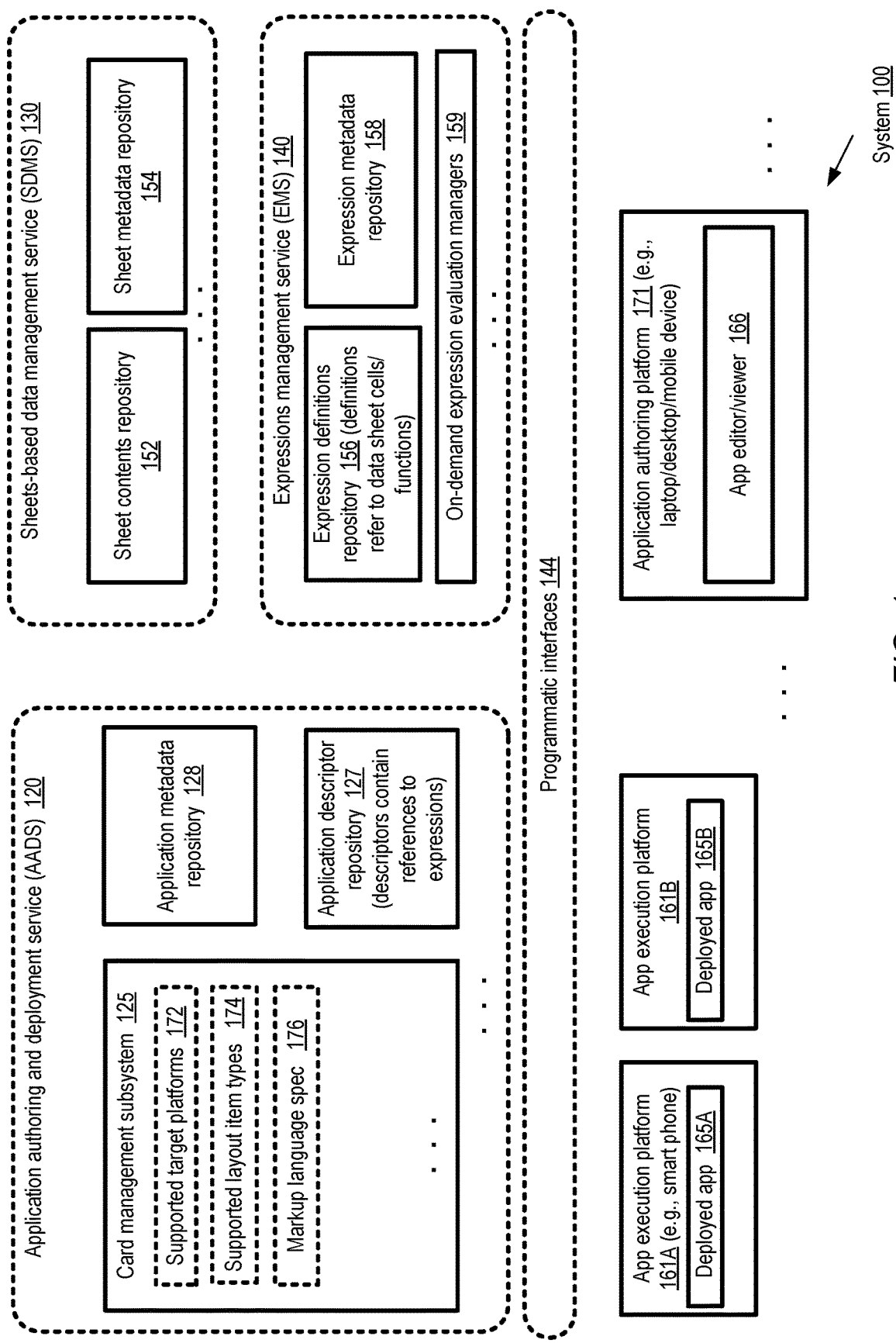
FIG. 1 illustrates an example system environment in which an expressions management service used for data sheets based applications may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing and utilizing an expressions management service for data sheet based applications are described. Such applications may, for example, be designed for deployment to mobile environments (such as smart phones) and/or web browser-based execution environments in some embodiments, and may use an underlying network-accessible data management service that supports a "web-of-sheets" model for application data. In the web-of-sheets model, data may be stored in logically linkable two-dimensional cell grids or "data sheets", with automatic instantiation of child data sheets to represent hierarchical relationships, as well as the ability to represent invariant associations between proxy cells and groups of other cells. The expressions management service (EMS) may allow users such as application authors to define and store, independently of the data sheets themselves, expressions that reference contents of cells of the data sheets in various embodiments, and to use such expressions to perform both reads and writes with respect to the underlying data sheets within the applications. In effect, an expression may be considered a cell that is not itself bound to a data sheet, but can refer to cells of one or more data sheets. Several different attributes of a given expression may be stored at an EMS in some embodiments, including for example a formula and a formatting specification for a result of evaluating the formula; additional attributes are discussed in further detail below. From within the applications, expressions may be referenced using unique identifiers in at least some embodiments; as a result, coordinates of the underlying data sheet cells may not be stored within the applications themselves.

The term "evaluating an expression" may be used in various embodiments as a shortened version of the term "evaluating the formula of the expression". Instead of being re-calculated every time the referenced cells are modified (e.g., as a result of updates performed by an administrator or user other than the user on whose behalf the application is run), expressions may be evaluated on-demand from within applications in various embodiments, thereby reducing computation resource usage substantially. Furthermore, if and when a formula used in a given expression is modified, e.g., as a result of structural changes to the underlying data sheets and/or due to other formula edits during or after the application authoring phase, data sheet cells that refer to the formula may be automatically updated, and any components of the application that use the expression may also be automatically updated in at least some embodiments. As a result of such automated propagation of changes, the robustness of the applications may be significantly enhanced in various embodiments—e.g., bugs that result from incorrectly resolved references to data sheet cells may be avoided. Furthermore, by using expression identifiers (instead of data sheet cell coordinates) within applications as mentioned above, data security may also be enhanced in at least some embodiments, as the cell coordinates and contents may not be made accessible directly to application users.

In some embodiments, an application authoring and deployment service, a sheets based data management service and an expressions management service may be used together, e.g., at a provider network or cloud computing environment to help design, implement and deploy applications of various types. As one skilled in the art will appreciate in light of this disclosure, certain embodiments may be capable of achieving various technical advantages in practical applications, including some or all of the following: (a) improved performance for applications that use data sheets for storing data sets (e.g., resulting from on-demand expression evaluation rather than sheet update-based expression evaluation), (b) enhanced application security (e.g., as a result of the use of expression identifiers within the applications instead of directly referring to data sheet cells), (c) reduction in the number of bugs/errors caused by incorrect references to sheet cells (e.g., due to automated propagation of expression formula changes, within applications as well as within the referenced data sheets), and/or (d) simplified design, coding, debugging and testing of applications (e.g., resulting from the treatment of expressions as uniquely named first class objects usable independently of the current state of the underlying data sheets), potentially leading to faster development of applications by a wider range of application authors.

The use of a web-of-sheets model, together with the treatment of expressions as first class objects that are stored separately from the data sheets themselves, may enable application authors to interact with large amounts of data, with fairly complex logical interrelationships among different subsets of the data, while still using a familiar spreadsheet-like interface in various embodiments. In at least some embodiments, the data stored using the web-of-sheets model may be linked to, and/or used to populate, layout elements of mobile applications (applications intended for deployment to mobile execution platforms such as phones, tablets, wearable devices and the like) via a "card" abstraction layer. A given card may correspond to one or more screen layouts of the flow of a mobile application in some embodiments, with the mobile application represented as a collection of cards corresponding to successive layouts that may be encountered by an application user as the user interacts with the application. Various elements of a given card may be bound to respective expressions defined by an application author using an application authoring interface in at least some embodiments. For example, in some embodiments, records of respective 1:1 bindings or mappings between individual elements of an application user interface (e.g., layout elements on a screen displayed on a phone or tablet) and expression-based actions/operations to be implemented (which may include, for example, evaluating an expression and presenting the results via the interface, and/or modifying data stored in one or more data sheet cells identified using the result of evaluating an expression) may be stored at the application authoring and deployment service.

In various embodiments, an application authoring and deployment service may also provide a set of interfaces that enable live propagation of application updates to subscribed client devices, offline development of applications by various collaborating application authors, automatic application synchronization, local application customization on client devices, intelligent notification management, as well as a variety of analytics capabilities. The terms "developer" and "author" may be used interchangeably in various embodiment to refer to clients of an application authoring and deployment service that utilize the service to create, modify and/or deploy applications, including applications whose operations depend at least in part on the evaluation of expressions for which respective persistent records are stored in one or more repositories of an expressions management service. In at least some embodiments, the service may simplify the process of application development to such an extent that application users (who may not necessarily be experts in data management or application development) may themselves customize applications or author new applications; as such, the community of potential application authors may be expanded to include non-expert application users in such embodiments.

According to at least one embodiment, a system may comprise one or more computing devices of one or more network-accessible services. The devices may include instructions that upon execution on or across one or more processors cause the computing devices to obtain an indication that a at least one data sheet is to be used to store at least a portion of a data set accessed from an application. The data sheet may comprise a two-dimensional grid of cells, with the coordinates or locations of individual cells being expressed for example by providing a respective row identifier and a respective column identifier (in some cases, e.g., when cells of multiple data sheets are being referenced, a sheet identifier may also be included in the coordinates). A persistent representation of a cell-based expression may be stored in a repository, e.g., of an expressions management service in some embodiments. One or more properties of the cell-based expression (e.g., a formula expressed in terms of data sheet cells and functions) may be indicated at least in part by input obtained via an application authoring interface in various embodiments. The cell-based expression may refer to one or more cells of the data sheet, and the persistent representation of the expression may comprise a unique identifier assigned to the cell-based expression in some embodiments.

A version of the application being authored, comprising references to one or more cell-based expressions within its logic or code, may be generated and stored. The application version may be propagated to one or more execution platforms (such as smart phones, mobile computing devices, laptops, desktops or the like). In the propagated application version, one or more screen layouts may display a value based at least partly on evaluating the expression in various embodiments, and/or data entered into an element of a screen layout may be used to modify an underlying data sheet based on an expression associated with the element. In the stored representation of the application, the unique identifier of the expression may be used to indicate the association between the layouts and the expression in some embodiments—e.g., instead of using the coordinates of the cells on which the expression depends, the application may simply use the unique identifier of the expression. In response to a detection of a write directed to one of the cells on which the expression depends, i.e., a write which affects the expression's formula, modified contents of the cell may be stored in various embodiments without re-evaluating the expression itself. Instead, the expression may only be re-evaluated as and when needed from the application—e.g., in response to obtaining a request to view a layout in a running instance of the application, the expression may be re-evaluated and the value based on the result of the re-evaluation may be displayed as part of the layout.

In at least one embodiment, when the underlying data sheet cells referenced in an expression are modified, a staleness notification or indicator may be provided to application users, which may prompt the users to request re-evaluation of the screen layouts in which the expression is used (e.g., by using the equivalent of a "refresh" element in the application user interface). In some embodiments, permissions associated with an expression may also be stored as part of the record representing the expression in a persistent repository. Permissions to be used to manage accesses/modifications of an expression during the application authoring phase and/or during application execution may be stored in various embodiments. In some embodiments, formatting specifications indicating how results of evaluating an expression are to be displayed/formatted for presentation in the application (e.g., the format in which a numerical result or date is to be shown within the application, the format and fonts to be used for text, etc.) may be stored as part of the expression record or metadata. In at least one embodiment, user-defined names or identifiers may be stored for individual expressions—e.g., a user-defined name "MyPayrollExpression1" may be used within various components of an application (or within various cells of one or more data sheets) to refer to a particular expression re-used in the different components. In some embodiments, search queries (e.g., with specified query parameters such as application identifiers, user-defined names of expressions, expression identifiers, cell coordinates references, data sheet functions such as average, standard deviation or the like) may be submitted by users to obtain a set of expressions stored at an expressions management service. In some embodiments, an expressions management service may be used for workflow applications (e.g., applications in which decisions regarding the next set of operations to be performed as part of an automated workflow are based at least partly on evaluating an expression which references data sheet cells) and/or other types of applications, in addition to applications with user interfaces displayed at mobile computing devices or smart phones. In various embodiments, applications that support user interactions (e.g., requests to perform various types of operations supported by the applications) via any of a wide variety of interfaces may utilize persistent expressions of the kind described herein. Such interfaces may include, among others, screens/microphones/cameras of mobile computing devices such as smart phones and tablets, audio interfaces of automated personal assistant devices, gesture recognition interfaces, virtual reality or augmented reality interfaces, and the like.

According to at least some embodiments, when structural modifications (such as the addition of rows or columns) are made to the data sheet whose cells are referenced in an expression, metadata pertaining to the expression may be automatically updated in the repository of an expressions management service—for example, stored coordinates of cells affected by the structural change may be adjusted to reflect the structure change. In at least one embodiment, in response to a modification or edit to an expression, a plurality of cells of one or more data sheets which reference the expression may be modified automatically, e.g., without requiring the user to manually edit all the cells that use the same expression. In one embodiment, an index whose entries indicate the data sheet cells which reference a given expression may be maintained, e.g., at the expressions management service and/or the sheets based data management service, and such an index may be used to propagate or perform consistent updates when the expression is modified and/or when the sheet(s) are modified.

In some embodiments, at application run-time, parameters may be passed in an expression evaluation request, and such parameters may be used to filter the contents of the data sheet that are used to evaluate the expression. For example, consider a scenario in which user A and user B of an application are each permitted to view sheet-based data pertaining to their respective organizational units Department-A and Department-B, but neither user is permitted to access data pertaining to other organizational units. In such a scenario, an identifier of Department-A may be passed as a parameter during expression evaluation when the application is run on behalf of user A, and an identifier of Department-B may be passed as a parameter during expression evaluation when the application is run on behalf of user B, and such parameters may be used to filter the contents of the data sheet such that each user is only presented with the expression evaluation results associated with their respective organizational units.

In some embodiments, an application (e.g., App1) may utilize an expression (e.g., Expr1) whose formula (e.g., F1) references a set of cells (e.g., {c1}) of one or more data sheets (e.g., {DS1}), while the data sheets themselves do not include the formula. For example, the formula F1 may compute an average of the values stored in {c1}, but none of the cells in the data sheets themselves may necessarily be populated using formula F1. As such, in such embodiments, the specific way in which sheet data is used in or by the application App1 may not necessarily be apparent within the sheets {DS1} themselves, thereby providing an additional level of isolation between the underlying data and the application. Furthermore, in some such embodiments, within the stored/executable version of application App1 itself, Expr1 may only be referenced using a unique identifier which does not include the coordinates of {c1}, so an examination of the application may also not reveal exactly which portions of {DS1} are being accessed/modified by App1. The mappings between Expr1, F1 and {c1} may be stored in a record representing Expr1 in the repository of the expressions management service in such embodiments, and the service may be responsible for using such mappings to dynamically evaluate Expr1 as and when required during the execution of instances of App1 on behalf of various users.

In various embodiments, expressions may be used within applications to perform writes and/or reads directed to data sheets. For example, a data value may be entered or indicated by an application user via an interactive interface element (e.g., a form field) of a data sheets-based application, an expression stored in the repository of the expressions management service and referenced within the application may be used to identify one or more cells to be modified based on the input provided via the interface element, and the cells may be modified based on the data value and the expression. The data value itself, and/or a result of a function (indicated in the application code) applied to the data value may be stored in the cells identified using the expression in some embodiments. In some embodiments, the values stored in the targeted cells (whose coordinates are identified using one expression indicated in the application) may in turn be determined by evaluating another expression indicated in the application; as such, multiple expressions may be bound or linked to a given element of an application user interface. For example, one expression E1 bound to a data entry layout element L1 may be used to identify a cell C1 to be updated when data D1 is entered into L1, and D1 may be provided as part of the input to the formula of another expression E2 (also bound to L1) to determine the value to be stored in C1.

In various embodiments, application authors utilizing an application authoring and deployment service may leverage their existing spreadsheet skills to build simple, collaborative mobile experiences. Authors may easily build screens that provide familiar mobile layout paradigms from simple vertical lists to custom layouts such as calendars, maps, or charts, for example. The information presented in these screens may be linked to expressions that are in turn linked to data stored in a collection of persistent data sheets using a simple point and click interface in at least some embodiments. In one embodiment, a given card of an application may contain one or more layout elements, and a given layout element may comprise one or more card cells that are in turn linkable to underlying data sheet cells via expressions. A rich set of formatting options may be provided in various embodiments that govern how data is displayed and changed; such formatting specifications may be included in the records representing expressions. Operations such as uploading a photo or video into a mobile application, linking to web content, and building forms may also be supported in various embodiments. Application authors may add global navigation such as bottom bars, drawers, and menus to mobile applications as desired in various embodiments. Out of the box application-wide styles may be supported in some embodiments, which may be used to personalize the look and feel of an entire application to better match the application's subject matter.

In various embodiments, the interfaces provided by the application authoring and deployment service may maintain a pervasive sense of liveness, ensuring that changes in the design of a card or changes to the sheet with which the card is linked are immediately visible and usable from the authoring environment and (if desired) one or more mobile devices. The service may allow authors to use expressions to facilitate authoring dynamic behaviors such as the selection of data to be linked to a card, customization of dynamic user interface elements, and/or data-driven application navigation in at least some embodiments.

In some embodiments, mobile applications may be authored and run in at least two modes: an "online" mode (with connectivity between the authoring service and a mobile device at which the application is being authored or run) and an "offline" mode (without such connectivity). When a mobile application is offline, the functionality of the web-of-sheets model and a locally-cached set of data sheets may remain available to the user or author, allowing them to continue to build applications with expression-based logic embedded in the data sheets. Using the locally-cached information, applications of various levels of complexity may be built in at least some embodiments, including for example applications with dashboards that summarize information, as well as dynamic views of lists. When a user or author goes back online, the service may attempt to automatically synchronize the data and the application in various embodiments, e.g., with a master version stored in a repository. If and when merge conflicts occur, in at least some embodiments the service may provide the user or author details regarding the conflicts (e.g., which other entity made conflicting changes and when), and may provide easy default methods to resolve conflicts. In at least some embodiments, users or authors may be provided with reminders when they have unsynchronized data, e.g., using local notifications, to reduce the probability they accidentally lose data or fail to act on unresolved conflicts.

In at least one embodiment, the application authoring and deployment service may enable interoperability between mobile applications and processes, other applications or other services running in a cloud environment, e.g., by collaborating via data sheets. For example, in some embodiments processes that push data or their state into a data sheet via an expression can be represented via a card, and data updates or new data added by cards to a linked sheet may be used to start, update, or terminate process instances. If and when data for an application eventually grows too large and/or the number of authors or users exceeds a threshold, in some embodiments the application data may be fanned out or distributed among specific users or authors, e.g., using per-user sub-sheets, resulting in reduced conflicts and decreased load time. Such partitioning may be accomplished seamlessly in at least some cases, e.g., via a transformation of simple single-table applications using expressions to navigate into and out of sub-sheets.

The process of authoring a mobile application using an application authoring and deployment service may be initiated in a variety of ways. In one embodiment, for example, an application author may submit an application authoring initiation request which indicates a set of one or more data sheets to be used to store the application's data. In response, the service may create an initial or default card to be used for the to-be-developed application, and store metadata records indicating the linkage between the application, the card, expressions associated with the card, and the data sheets. For example, the metadata records may indicate that the layout represented by the card is to be used for the application, and which cells of the sheets are to be used to evaluate expressions used to populate particular layout elements. In at least some embodiments, the service may provide a set of template applications from which one may be selected by an application author as a starting point for a new application. A given template application may have one or more associated default cards (and/or one or more default data sheets), indicating respective default layouts with one or more layout elements. The application author may then utilize the authoring interfaces and tools provided by the service to modify the default cards and layouts as needed in various embodiments.

A variety of layout element types may be supported in different embodiments. In some embodiments, for example, a particular layout item which may be indicated in a card may comprise one or more of: (a) a content container comprising an ordered combination of text and one or more card cells, where at least one card cell is associated with a cell of a data sheet, (b) a data entry form, (c) a repeater which iterates over individual rows of at least a portion of a data sheet, (d) a map, (e) a calendar entry, (f) a chart, (g) an image, or (h) a video. Individual layout elements may comprise other layout elements in at least some embodiments—that is, a hierarchical or containment relationship may be supported among various elements of a layout.

In at least one embodiment, one or more layout elements of a card, expressions associated with the card and/or the underlying data sheets may be dynamically linked to respective processes (e.g., operating system processes), workflows comprising a plurality of processes, or services of a provider network or some other application which can be invoked over a network. In such an embodiment, in response to determining that a particular cell of a sheet associated with a mobile application has been updated (for example from a mobile computing device, either during application authoring or after an application has been developed and deployed), a process may be instantiated, updated or terminated at a provider network.

In some embodiments, respective expressions and respective portions of data sheets may be made editable by different collaborating authors. In response to input from one authorized application author, for example, a determination may be made that a first expression and a first portion of a data sheet is editable by a first application author, and that a second expression and a second portion of the same data sheet is editable by a second application author. Respective local copies of the editable entities/objects may be cached at the devices being used by the authors in some embodiments, enabling the authors to work on their expressions, their portions of the sheets and the corresponding portion of the application in parallel as desired. When an application author modifies a card of a locally cached application, the contents of the card may be obtained from the locally cached sheets in at least some modes of operation in various embodiments. The application authoring and deployment service may enable devices to be registered to receive notifications of application updates (e.g., generated by various collaborating authors) in various embodiments. In such an embodiment, when one author commits an update, notifications indicating the update has occurred may be provided to one or more other devices registered with the service. In effect, one or more devices may be designated as a respective live previewing, interaction and editing environment using the registration mechanism in various embodiments.

In at least some embodiments, a given application may be deployed at several different target platforms—e.g., phones running different operating systems may be targeted, tablet devices running different operating systems may be targeted, and so on. The authoring tools may be designed to display customized versions of a given application for the different target deployment platforms—e.g., a first version of a layout (customized for a first platform) may be displayed at a device in response to receiving input indicating the first platform, and then a second version of a layout (customized for a second platform) may be displayed at the device in response to receiving input indicating the second platform.

The cards-based development methodology supported by the application authoring and deployment service may allow most features of many mobile applications to be implemented using simple point-and-click types of interactions (e.g., via "what-you-see-is-what-you-get" or WYSIWYG editing tools), without requiring application code to be entered by application authors in at least some embodiments. However, in at least some embodiments, interfaces may be provided for those authors who wish to provide application source code (e.g., for advanced features that may not be covered by the point-and-click interactions), including code that accesses cell-based expressions, in any of several programming or scripting languages, to submit such source code for various features or functions of the application. In at least some embodiments, persistent versions of the cards associated with a mobile applications may be stored at the service's repository, and may be formatted according to a markup language (e.g., a markup language based on JSON, XML or the like).

In some embodiments, an expressions management service, an application authoring and deployment service and/or a sheets based data management service may be implemented at a provider network or cloud computing environment. A customer or client of such a service, such as a businessperson who may not necessarily be skilled in at least some aspects of application development or data management but may be somewhat familiar with commonly-available spreadsheet programs, may utilize the service from various types of front-end programs running on a variety of client-side devices such as mobile phones, tablets, laptops, desktops and the like. The data entered into the cells of a given data sheet, and/or the metadata associated with the expressions and cards linked to the data sheet, may be stored at one or more storage servers at a data center, and various techniques to support high levels of availability, durability and the like for the application data and metadata may be implemented transparently. As such, an author or user of the application authoring and deployment service may not necessarily be aware of the specific algorithms and devices used to store and protect the application data and metadata. Individual authors or groups of authors may set up shared workspaces for collaborative application development in some embodiments, and workbooks comprising one or more data sheets may be created within a workspace at the request of an author. In various embodiments, techniques similar to those introduced above for authoring applications intended for mobile application environments (e.g., phones, wearable devices and the like) may be applied with equal success for authoring applications for other types of execution environments including the web environment (e.g., applications that are to run at web browsers on devices including desktops, laptop computers, tablet devices and the like), for workflow automation applications, and so on.

Example System Environment

FIG. 1 illustrates an example system environment in which an expressions management service used for data sheets based applications may be implemented, according to at least some embodiments. As shown, system 100 may include resources and artifacts of an expressions management service (EMS) 140, a sheets-based data management service (SDMS) 130, and an application authoring and deployment service (AADS) 120 in the depicted embodiment. At least two categories of clients may utilize the combination of network-accessible services 120, 130 and 140 in the depicted embodiment, using a set of programmatic interfaces 144: application authors or developers, and application end-users.

Application authors may utilize authoring interfaces such as application editor/viewer 166 running at authoring platforms 171 (such as laptops, desktops, mobile devices or the like) to generate and store card-based applications in the depicted embodiment. As mentioned earlier, a given card may correspond to one or more screen layouts of the flow of an application in some embodiments, with the application represented as a collection of cards corresponding to successive layouts that may be encountered by an application user as the user interacts with the application. Various subcomponents or elements of a given card or layout may be bound to respective expressions (or multiple expressions) in the depicted embodiment, with individual expressions in turn comprising a formula that refers to one or more cells of one or more data sheets, with each data sheet comprising a two-dimensional grid of cells. As part of the process of authoring an application to be managed using AADS 120, an application author may provide input specifying an expression to be used within one or more cards of an application (e.g., an expression to determine a value to be displayed in a text or numeric field of a user interface of the application). For example, an expression may be specified using a syntax similar to the following: [SheetA!min(average(a1:a10), average(b40:b100))], indicating that the minimum of two average values (one average obtained from cells a1 through a10 of a data sheet SheetA, and the second average obtained from cells b40 through b100 of SheetA) is to be obtained as the value of the expression. The expression may refer to one or more cells within one or more data sheets stored in the SDMS 130, and a persistent record of the expression (including for example the formula to be used to evaluate the expression) and associated metadata may be stored in the EMS 140, e.g., in an express definition repository 156 and/or an expression metadata repository 158 in some embodiments. Note that the contents of the data sheets, whose cells may be referenced in the expressions, may be stored on sheet contents repository 152, separately from the expression definitions and expressions metadata repository in the depicted embodiment. As such, expressions may be treated as first class objects, with a separate set of programmatic interfaces supported for creating, reading, evaluating, updating and deleting expressions than the interfaces used for the corresponding operations on the data sheets.

The card management subsystem 125 may enable applications to be developed or authored for a plurality of supported target deployment platforms 172, such as various combinations of hardware and operating systems used for mobile phones, tablet computing devices, wearable computing devices and the like in the depicted embodiment. Cards corresponding to respective sets of one or more screen layouts of various application workflows may be constructed from a variety of layout items of supported item types 174 using simple "what-you-see-is-what-you-get" or WYSIWYG application authoring tools or interfaces (such as application editor/viewer 166) in various embodiments. Persistent versions of the cards may be stored in a markup language defined in a specification 176 in at least some embodiments, and transmitted to various authoring devices for local caching as needed. Persistent representations or descriptors of the applications, which include references to expressions stored in the EMS, may be stored in a repository 127 of the AADS in the depicted embodiment. Application metadata, such as the identities of application owners, application creation logs, application authoring permissions, application execution permissions, and the like, may be stored in a separate repository 128 in some embodiments. In addition to a sheets content repository 152, the SDMS 130 may include a separate sheet metadata repository 154 in at least some embodiments, which includes information about data sheet ownership, permissions and/or other sheet properties.

A variety of programmatic interfaces 144 may be implemented by the AADS 120, the SDMS 130 and/or the EMS 140 in the depicted embodiment, including for example respective sets of application programming interfaces (APIs), web-based consoles, graphical user interfaces, command-line tools and the like. Via such interfaces, an indication that a data sheet is to be used to store at least a portion of a data set accessed from an application being developed may be obtained in various embodiments at one or more of the services. A persistent representation of a cell-based expression indicated at least in part by input obtained via an application authoring interface may be stored in the expressions definition repository 156. The persistent representation may comprise a unique identifier assigned to the cell-based expression, and the expression itself may refer to one or more cells of one or more sheets stored in the SDMS, and/or to mathematical/statistical functions supported foe cell-based data at the SDMS. A version of the application may be deployed to one or more execution platforms (such as platforms 161A or 161B). In the deployed version, at least one screen layout may be configured to display a value based at least in part on evaluating the expression. The version of the application may use the unique identifier to refer to the expression in at least some embodiments, and may not indicate the coordinates of the data sheet cells that are referenced in the expression. If/when the cells are modified, e.g., by a write operation directed to the data sheet in which the cells are included, the contents of the cells may be updated/modified without re-evaluating the expression itself in various embodiments; this approach may be referred to as deferred evaluation. Deferring evaluation of expressions until the evaluations are needed for a running instance of an application may save considerable processing resources in various embodiments, especially in scenarios where the underlying data sets of applications are changed frequently.

When an application end user issues a request to run an instance of a deployed app (e.g., 165A or 165B) at an execution platform 161B, the layouts corresponding to one or more cards of the application may be displayed, e.g., in the order indicated in the application descriptor stored in repository 127. In response to obtaining an end-user's request to view a layout that requires evaluation of a previously-stored expression in a running instance of the application, the expression may be re-evaluated using the modified contents of cell(s) by an on-demand expression evaluation manager 159, and a result of the re-evaluation may be used to populate the layout. Consider an example scenario in which a mobile application deployed to hundreds of thousands, or even millions of cell phones, comprises numerous cards with corresponding expression-dependent display layout elements, not all of which are necessarily reached during any given execution of the application. By deferring the evaluation of an expression until the corresponding result is actually needed by a running application instance, the processing requirements associated with expression evaluation may be reduced by orders of magnitude in such a scenario, as only a small fraction of the deployed application instances may reach the stage where a given expression has to be re-evaluated. Furthermore, by referring to expressions within the applications using identifiers instead of sheet cell coordinates, the underlying data sheet contents may be isolated from the end users, thereby enhancing the security of the application data sets in various embodiments.

In some embodiments, a different approach may be taken with respect to organizing the operations associated with applications that use expressions to refer to contents of data sheets than that shown in FIG. 1. For example, in one embodiment, the described functionality of the application authoring and deployment service 120 may be combined with the described functionality of the expressions management service 140 into a single network-accessible service, the AADS and the SDMS may be combined into a single service, or all three services (the AADS, the SDMS and the EMS) may be implemented as a single service. Individual ones of the components of various ones of the services shown in FIG. 1 may be implemented using one or more computing devices in various embodiments. In at least one embodiment, separate repositories may not be used for storing object contents and metadata at a given service—for example, sheet contents and sheet metadata may be stored at a single repository, expression definitions and expressions metadata may be stored at a single repository, and/or application descriptors and application metadata may be stored at a single repository.

Example Repository of Expression Definitions Obtained from Application Authors

Figure 2:
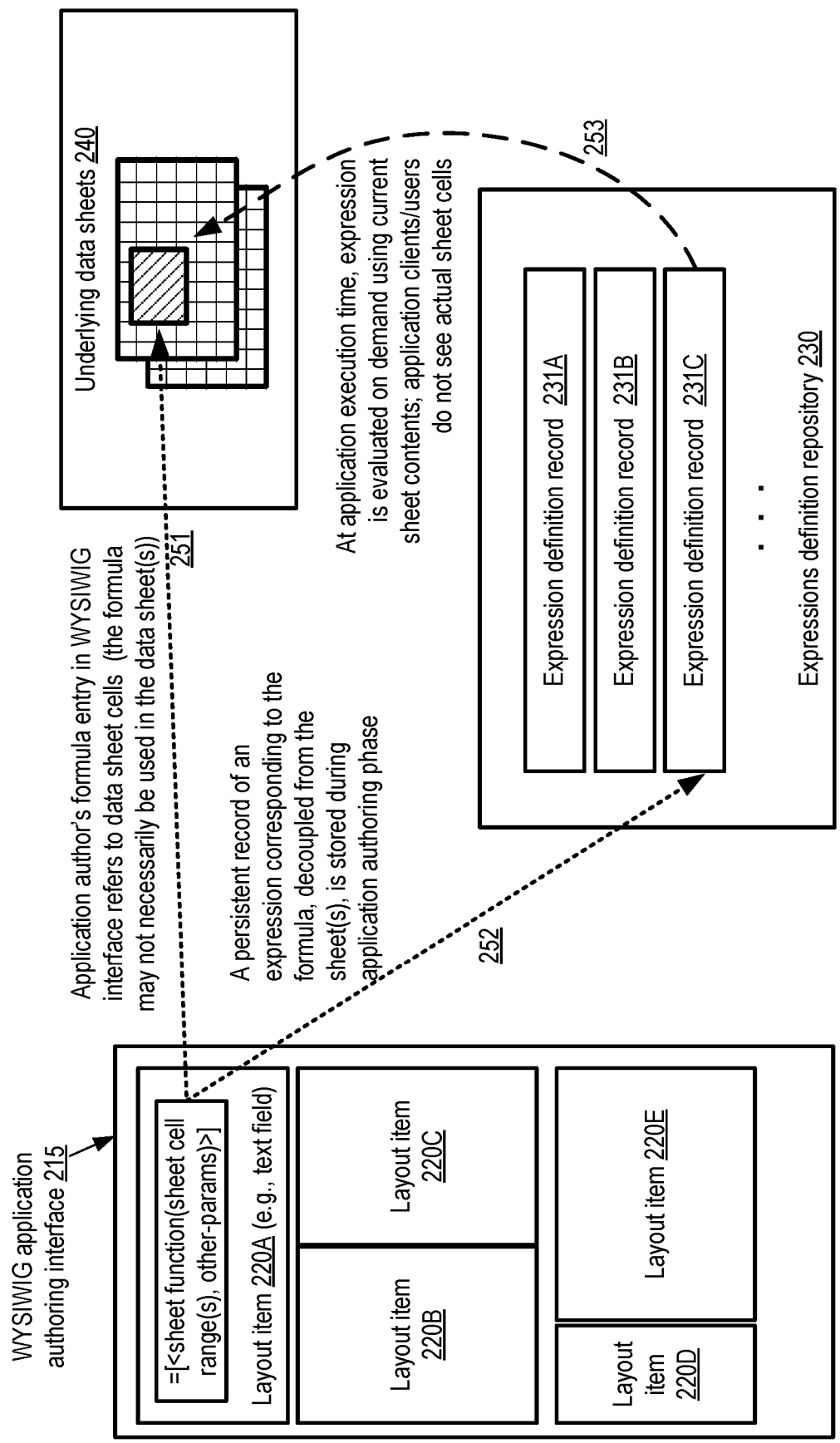
FIG. 2 illustrates an example repository at which expression definition records generated on behalf of application authors may be stored, according to at least some embodiments.

FIG. 2 illustrates an example repository at which expression definition records generated on behalf of application authors may be stored, according to at least some embodiments. In the depicted embodiment, an application author or developer may utilize a WYSIWIG (what you see is what you get) authoring interface 215 to generate an application with a plurality of layout items 220. As discussed earlier, in some embodiments, a given application intended to be deployed to a mobile phone or other mobile computing device may be organized as a set of cards, with individual cards corresponding to individual screen layouts. In the depicted example scenario, the application being authored includes a card comprising screen layout items 220A, 220B, 220C, 220D, and 220E. Individual ones of the layout items may, for example, comprise text fields or containers (as in the case of layout item 220A), repeaters used for iterating over values of an underlying data set, calendar entries, charts/images, forms which may be used for data entry, maps, contact entries, video clips and so on. A repeater may be considered the logical equivalent of a recursion mechanism for layout items in various embodiments—e.g., a given repeater may be used to iterate a set of other layout items (which may include other repeaters, which may in turn iterate over other items, and so on) over some set of rows or cells of one or more data sheets.

In layout item 220A, the application author may enter a formula of an expression "=[<sheet function (sheet cell range(s), other parameters)>]" in the depicted example scenario. The sheet function included in the expression may comprise any of numerous mathematical/statistical/analytics functions supported for a set of underlying data sheets 240, such as average, maximum, standard deviation, sum, minimum, and so on. Note that a function may not necessarily be used for an expression; some expressions may refer to or display contents of sheet cells without applying functions to the cell contents. The application author's formula entry in the WYSIWIG interface may refer to some number of cells ("sheet cell range(s)") within one or more data sheets in the depicted embodiment, as indicated by arrow 251. Note that the data sheets themselves need not necessarily contain a cell with the same formula in at least some embodiments—that is, none of the cells of the data sheets may necessarily be populated by a formula entered by an application author. Of course, in some cases one or more cells of one or more data sheets 240 may also be populated with the formula entered by the application author.

When the application author enters a formula via an application authoring interface such as interface 215, a corresponding persistent expression definition record 231 (e.g., expression definition record 231C in the case of the formula shown being entered in layout item 220A) may be stored in an expressions definition repository 230 in some embodiments, as indicated by arrow 252. As such, the record 231 defining the expression may be decoupled from the cells of the sheets 240 to which it refers. The repository 230 may, for example, be maintained using resources of an expressions management service similar in features and functionality to service 140 of FIG. 1. In one embodiment, to indicate whether the text entered by an application author is to be treated as an expression for which a persistent record separate from the referenced sheet cells is to be created, the author may use delimiters or tokens to indicate the to-be-persisted expression's formula—e.g., a starting delimiter "[[" and an ending delimiter "]]" may be used around the formula. In some embodiments, an expression author may decide, when entering a formula via an authoring interface, whether an expression definition record is to be created for the formula or not (e.g., an interface element or parameter offering the option "store expression record?" may be presented to the application author as part of the interface, and the persistent record 231 may only be created for an entered formula if the author indicates that such a record should be created).

The repository 230 may comprise a plurality of expression definition records 231 in various embodiments, each comprising at least a respective unique identifier and a formula. At application execution time, as and when a layout element that depends on the value of an expression is to be displayed, the expression may be evaluated on demand using the current contents of the underlying data sheets 240 in various embodiments, as indicated by arrow 253. Application clients/users may only see the results of the evaluation (or values derived from the results of the evaluation), and not the contents of the referenced data sheet cells in various embodiments, thus isolating the application's data sets from end users and thereby enhancing the security of the data sets. If/when the underlying data sheet contents are changed (e.g., because of writes from other application instances, writes by application administrators, or other types of changes to the application data), the expressions whose definition records are stored in repository 230 need not be re-evaluated in the depicted embodiment; instead, the expressions may only be re-evaluated when needed by an executing instance of the application.

Example Contents of Expression Definition Records

Figure 3:
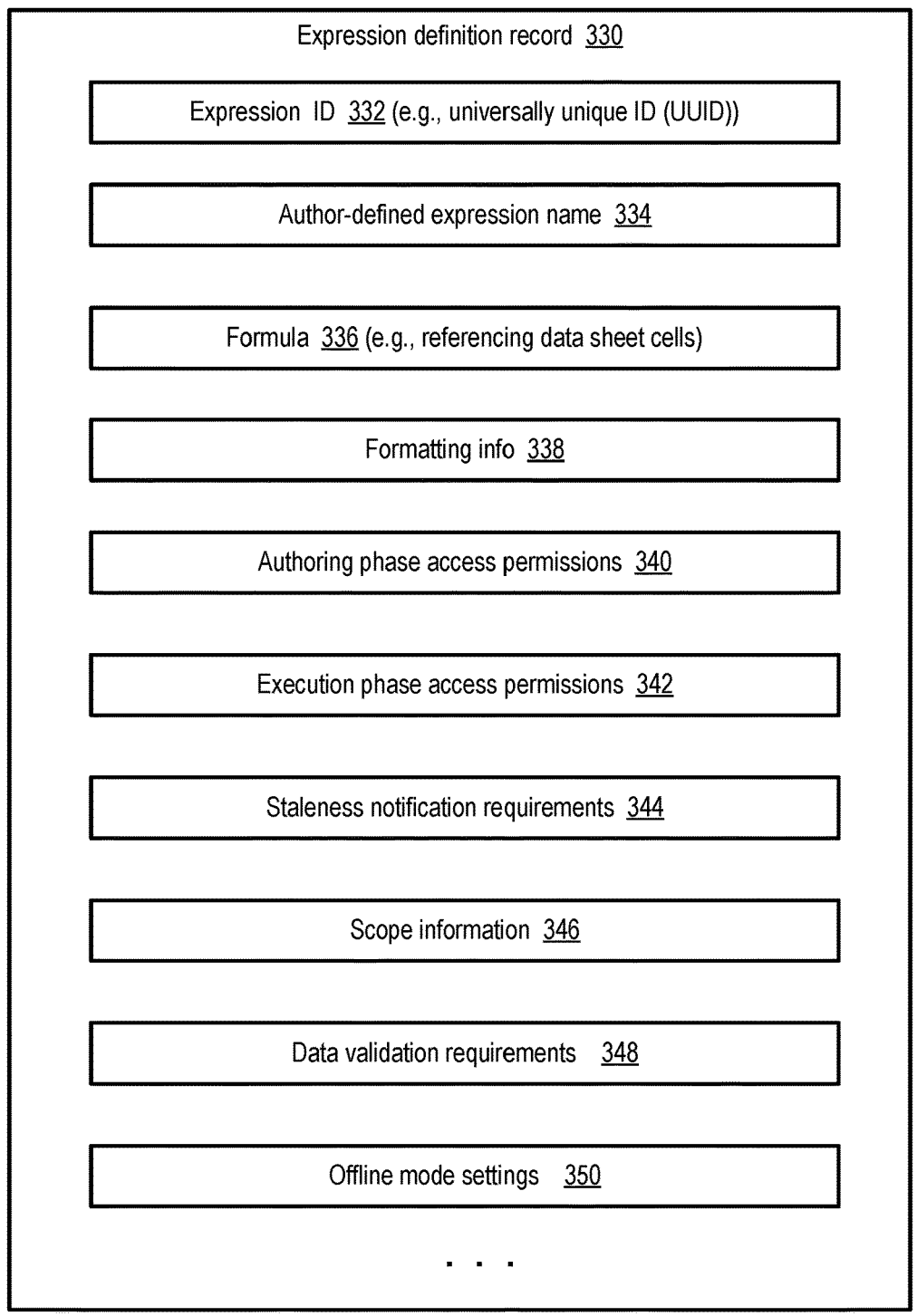
FIG. 3 illustrates example contents of expression definition records, according to at least some embodiments.

FIG. 3 illustrates example contents of expression definition records, according to at least some embodiments. As shown, in the depicted embodiment, an expression definition 330, generated and stored based on input received via an application authoring interface (similar to the interface 215 of FIG. 2) or some other expression creation/editing programmatic interface, may comprise numerous elements or fields, including for example an expression identifier (ID) 332 generated by an expressions management service. The scope of the namespace within which the identifier 332 is unique may vary in different embodiments—e.g., in some embodiments, each expression ID may be globally or universally unique with respect to all other expressions for which definition records are stored at the expressions management service, while in other embodiments the ID may be unique with respect to all the other expressions defined within a given application, or unique with respect to all the expressions defined on behalf of a given client, and so on. In at least one implementation, an expression ID may be generated by concatenating a number of elements, such as a timestamp, the identifier of the client on whose behalf the expression is being generated, a counter representing the set of expressions that have already been generated by the client, the name of the application or card for which the expression is being generated, an identifier of a layout element for which the expression is being generated, and so on.

In some embodiments, an application author or expression creator may specify a user-friendly expression name 334 for the expression, and the name may be stored as part of the definition record 330. Using such names (e.g., "AverageAge") may make it easier to re-use the same expression from different parts of an application, e.g., by entering the expression name instead of the corresponding formula (e.g., ("=[average([cellrange]]") in various layout elements of the application. User-defined expression names 334 may also be re-used within the data sheets—e.g., having defined the user name "AverageAge", the application author may enter the text "AverageAge" in various cells of the data sheets, and the sheet based data management service may interpret the text based on the expression definition record for which "AverageAge" is specified as the name.

The formula 336 of the expression, referencing one or more cells of one or more data sheets, may be stored as part of the expression definition. The formula may be re-evaluated dynamically as and when needed from a running instance of an application in various embodiments as described earlier. Formatting information 338 may indicate the manner in which the result of evaluating the formula 336 is to be presented within a layout element of the application in which the formula is referenced in the depicted embodiment, e.g., whether a numerical result of the evaluation is to be rounded to the nearest integer, expressed as a decimal value with a specified number of spaces after the decimal point, and so on. Formatting information 338 (which may also be referred to as a formatting specification) may be expressed using a variety of techniques in different embodiments, e.g., using respective notations for numeric values, dates, non-numeric text and the like.

In some embodiments, one or more types of access permissions associated with the expression may be included in the definition record 330—e.g., authoring phase access permissions 340 may indicate a set of users or entities that are permitted to modify/read the expression during application authoring, while execution phase access permissions 342 may indicate a set of users or entities that are permitted to modify/read the expression (or view the result of evaluating the expression's formula 338) at application runtime. In some cases, for example, administrators or authors of an application may be permitted to modify expressions used within the application at run-time, while other classes of users may not be permitted to do so. In the depicted embodiment, a staleness notification requirements element 344 may be used to indicate (e.g., based on guidance received from the creator or author of the expression) whether, if the underlying data sheet cells referenced in the expression's formula are modified, a staleness indicator message or notification is to be sent to running instances of applications that refer to the expression. Such notifications may, for example, indicate to application end users that the output being displayed in the application may have to be refreshed.

In various embodiments, the formula 336 associated with the expression may be expressed either in absolute terms (e.g., explicitly naming one or more data sheets whose cells are referenced, and/or naming logical tables within the data sheets), or in relative terms (e.g., with differences between the coordinates of the current cell and other referenced cells being used). Scope information 346 may optionally be stored within an expression definition record 330 in some embodiments to indicate, using respective unique identifiers, the particular data sheet or sheets (or a set of one or more logical tables within a data sheet) with respect to which the formula 336 is to be evaluated, e.g., in cases where the formula does not provide specific names of the data sheets or tables, or in cases where disambiguation may be advisable or required among data sheets or tables with similar or identical names. When an expression is dynamically evaluated, the scope information may be used to identify the particular sheets or logical tables whose cell contents are to be used for the evaluation in at least some embodiments. In addition, in at least one embodiment the scope information may be used to identify the particular cells that need to be updated when changes to an expression are being propagated to one or more sheet locations (as discussed in the context of FIG. 5).

In some embodiments, one or more data validation requirements 348 may optionally be stored for some expressions. Such requirements may indicate, for example, a set or range of permissible values that can be entered into a field of an application's user interface in a scenario in which the entered data is to be stored in a cell whose coordinates are based on evaluating the expression's formula, or in scenarios in which other expression evaluation dependent actions are to be performed. For example, an application author may wish to only allow values in the integer range 0-100 for one data entry field of an application, or to only allow alphanumeric text to be entered for another data field. The data entered into the entry field associated with the expression may be checked (e.g., at application run-time) to see if it meets the validation requirements 348 stored in the expression definition record in such embodiments, and an error message may be generated (or some other response action may be initiated) if the data is found invalid. In some embodiments, personalized or customized data validation requirements may be associated with an expression and indicated in the expression record—that is, the set of data values that a given user is permitted to enter in an application data entry field associated with the expression may be dependent on the identity of the given user (e.g., as determined by a client identifier, user identifier or group identifier of the given user).

In some cases, applications that utilize dynamically-evaluated expressions for which respective persistent definition records 330 are stored may be run in several modes with respect to connectivity to the expressions management service (EMS), including for example an online mode and an offline mode. In the online mode, the device at which the application is deployed is connected to the EMS, while in the offline mode, the device may not have connectivity to the EMS for at least some time periods (or connectivity may be too poor to allow data to be transferred at desired performance levels in one or both directions between the EMS and the device). If an application can be run in offline mode, a local copy of the referenced data sheets, as well as other local application state metadata may be stored at the execution platform at which the application runs in offline mode. In some embodiments, while an application runs in offline mode, a user may be permitted to enter data into the application data entry fields associated with expressions, and writes corresponding to the entered data may be temporarily stored in a local copy of the referenced data sheets, stored at the device at which the application runs. When the device eventually re-connects to the EMS, the local copy of the data sheets may in some cases have to be re-synchronized or re-validated with respect to a "master" or authoritative version of the data sheets (which may be stored at a sheets-based data management service accessible from the EMS). In at least some embodiments, an expression definition record 330 may include an offline mode settings field 350, indicating for example (a) whether offline-mode writes are permitted into application data entry fields which lead to writes based on evaluating the expression, (b) whether one or more data re-validation requirements (similar to requirements 348) have to be met when an application that was running in offline mode reconnects to the EMS and/or (c) how potential conflicts resulting from offline writes from several different users are to be detected and resolved. Any of a variety of offline-to-online mode synchronization requirements including one or more types of data re-validations may be associated with a given expression (or a set of expressions) as part of the offline mode settings 350 in various embodiments, and corresponding operations may be performed with respect to the local copies of the data sheets when the application re-establishes connectivity to the EMS after a period of offline mode execution.

In some embodiments, one or more expression configuration settings (such as offline mode settings 350 or staleness notification requirements 344) may be defined at a higher level than at the individual expression level—e.g., some offline mode settings may apply for all the expressions used in a particular application, or for all of the expressions for which definition records are created by a given application author. In one embodiment, not all the kinds of elements shown in the expression definition record 330 of FIG. 3 for a given expression may necessarily be stored in a single data structure. Instead, respective subsets of the elements shown may be distributed among separate data structures or separate records—e.g., the access permission information may be stored separately from the remaining information.

Example Deferred Evaluation of Expressions

Figure 4:
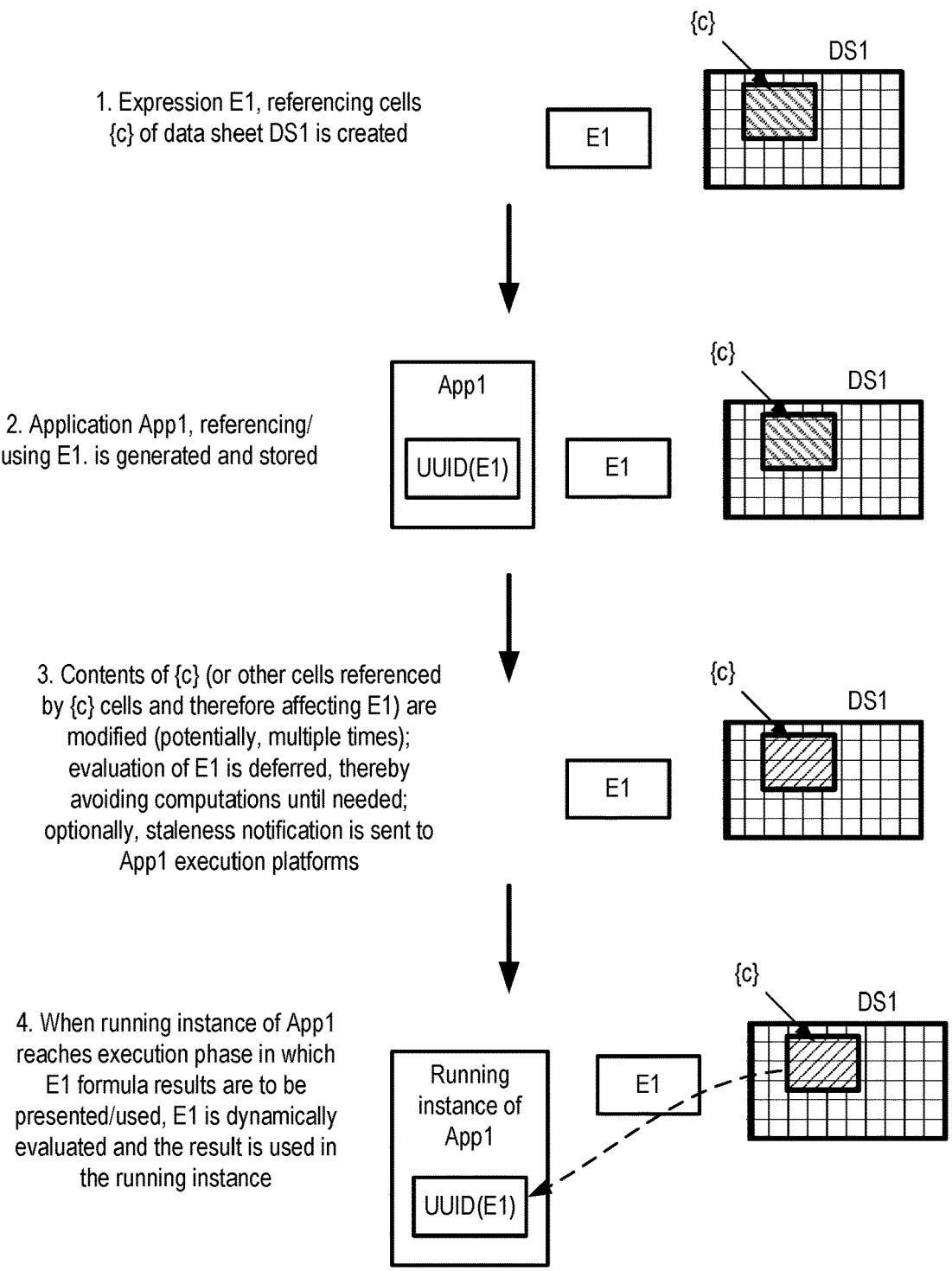
FIG. 4 illustrates an example sequence of operations including deferred on-demand evaluation of expressions during application execution, according to at least some embodiments.

FIG. 4 illustrates an example sequence of operations including deferred on-demand evaluation of expressions during application execution, according to at least some embodiments. In step 1, an expression E1 whose formula references one or more cells {c} of a data sheet DS1 may be created. For example, based at least in part on input received via an application authoring tool or interface similar to interface 215 of FIG. 2, or via some other expression editor, a persistent record of the expression E1 may be stored at a repository of an expressions management service similar in functionality to service 140 of FIG. 1.

A version of an application App1, referencing the expression via E1's universally unique identifier (UUID (E1)) may be stored in step 2 of the set of operations indicated in FIG. 4. In step 3, contents of one or more of the cells {c} (or other data sheet cells being referenced from {c}) may be modified, e.g., based on edits from administrators of the application App1, based on edits from one or more end users of the application, or because the data set underlying the application App1 has to be changed for any other reason. Even though such modifications would affect E1, evaluation of E1 may be deferred until needed from a running instance of App1 in the depicted embodiment, thereby potentially saving computation resources. Optionally, in some embodiments, staleness notifications/indicators may be transmitted/provided to running instances of App1 when the cell contents change. Such modifications may occur several times in some cases before E1 has to be re-evaluated based on the needs of a running instance of App1, in which case even more savings of computation resources may be achieved relative to scenarios in which E1 is re-evaluated every time referenced cells change.

As indicated in step 4, when a running instance of App1 reaches a stage or phase of execution in which the results of E1's formula are to be presented or otherwise used, E1 may be dynamically evaluated in the depicted embodiment. That is, the current contents of cells {c} may be used to determine a value corresponding to E1's formula.

Example Automated Propagation of Expression Updates

Figure 5:
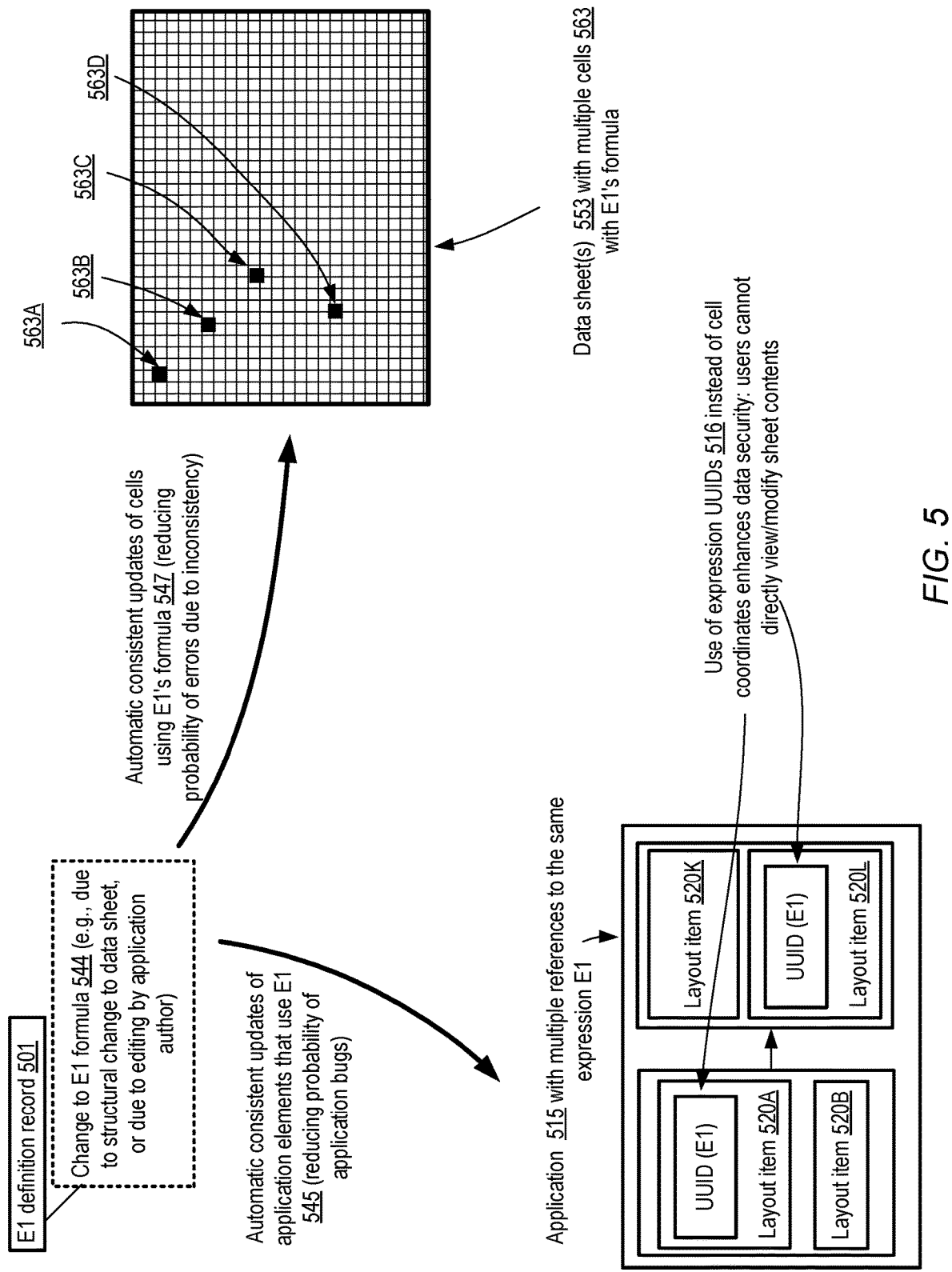
FIG. 5 illustrates example automated propagation of expression formula updates to data sheet cells and application components, according to at least some embodiments.

FIG. 5 illustrates example automated propagation of expression formula updates to data sheet cells and application components, according to at least some embodiments. A definition record 501 for an expression E1 may be generated and stored in the depicted embodiment, e.g., in response to input from an application author using interfaces similar to those discussed in the context of FIG. 1. When a change to an expression E1's formula 544 occurs, e.g., because of a structural change to the underlying data sheet(s) such as an addition/deletion of a row or column, or because of edits made by the application author, updates may be propagated automatically to one or more types of objects in the depicted embodiment.

In some cases, cells 563 in one or more data sheets 553 in a collection of data sheets managed by the data management service associated with the expressions management service may comprise E1's formula—that is, to evaluate individual ones of the cells 563A-563D, the same formula that is used for expression E1 may have to be evaluated. The data sheets 553 may include the same data sheets whose cells are referenced in the formula and/or other data sheets stored in the collection in the depicted embodiment. If and when E1's formula is updated, the sheet cells 563 that also use the same formula may also be updated automatically in the depicted embodiment, thereby reducing the probability of errors due to inconsistency. In at least some embodiments, scope information for E1 stored within the definition record 501, similar to the scope information 346 discussed in the context of FIG. 3, may be utilized during such automated propagation of updates to ensure that the correct cells 563 are modified.

In at least some embodiments, multiple components of an application 515 may refer to the expression E1. For example, as shown in FIG. 5, application 515 may comprise a plurality of layout items such as 520A, 520B, 520K and 520L, and several layout items such as 520A and 520L may refer to E1 using its unique identifier UUID (E1). When the formula for E1 is modified, the contents of the layout items 520A and 520L may also be automatically updated to reflect the changes to the formula in various embodiments. Note also that the use of UUIDs 516 instead of the actual cell coordinates indicated in the formula may help enhance data security in various embodiments, as application users may not be able to view or modify data sheet contents directly (using cell coordinates) when expressions are used as intermediary objects and referenced via identifiers that do not reveal the cell coordinates.

Example Programmatic Interactions

Figure 6:
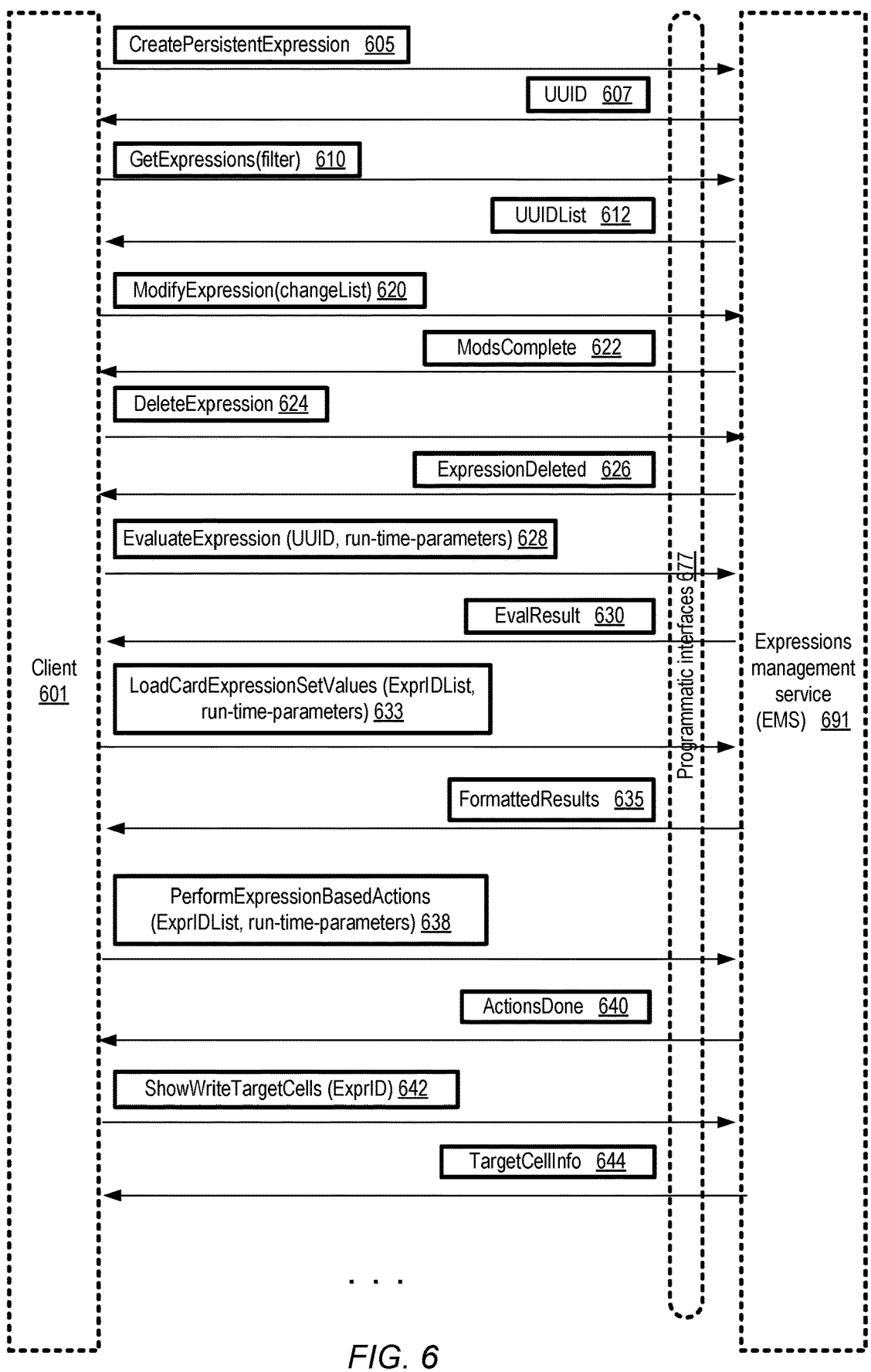
FIG. 6 illustrates example programmatic interactions between clients and an expressions management service, according to at least some embodiments.

FIG. 6 illustrates example programmatic interactions between clients and an expressions management service, according to at least some embodiments. In the depicted embodiment, an expressions management service (EMS) 691 (similar in functionality and features to EMS 140 of FIG. 1) may implement one or more programmatic interfaces 677, such as a set of APIs, command-line tools, graphical user interfaces, web-based consoles and the like, which may be used by clients 601 such as application authors and application end users to submit expression-related requests and receive corresponding responses. In some cases the programmatic interfaces 677 may be used from application authoring tools/interfaces and/or from running instances of applications created using such authoring tools. For example, when an application author enters a formula of an expression into an authoring tool, one or more APIs of the EMS 691 may be invoked, or when an application that uses an expression to populate one of its output fields or take some other actions is executed, one or more APIs of the EMS 691 may be invoked.

A client 601 may submit a CreatePersistentExpression request 605, specifying for example the formula of the expression, and the EMS may store a persistent expression definition record representing the created expression in response in the depicted embodiment. A universally unique identifier (UUID 607) of the created expression may be returned in some embodiments. In some embodiments, parameters of the CreatePersistentExpression request may indicate other properties of the expression, such as a user-defined name, access permissions, scope information, data validation requirements, offline mode requirements and the like.

A GetExpressions request 610 may be submitted by a client 601 via interfaces 677 to retrieve zero or more expressions that have previously been created and that meet a specified filtering criterion indicated by the filter parameter in the depicted embodiment. The filter parameter may, for example, indicate one or more application identifiers (indicating that identifiers of expressions used in the specified applications should be returned), part or all of one or more user-defined names (indicating that identifiers of expressions with matching names should be returned), part or all of one or more expression identifiers of the expressions being requested, one or more cell coordinates (indicating that identifiers of expressions whose formulas reference the specified cells should be returned), and/or one or more data sheet functions such as average, min, max and the like (indicating that identifiers of expressions whose formulas use the specified functions should be returned). In some embodiments, wild card characters such as "*" may be used to indicate that a partial match with one of the query parameters, rather than an exact match, may be used to filer the results. A list UUIDList 612 of the UUIDs of the expressions which meet the filtering criteria may be returned in the depicted embodiment. In some embodiments, e.g., in the case where the GetExpressions request specifies a UUID in its filter parameter, the entire filter definition record may be returned.

A ModifyExpression request 620 may be submitted to change one or more properties of an existing expression, with the requested changes indicated via a changeList parameter in the depicted embodiment. In response, if the requested changes are allowed by the current permissions settings of the targeted expression, the changes may be applied and a ModsComplete message 622 may be transmitted to the client. In some cases, the changes made to the expression may be automatically propagated to one or more application components and/or to one or more cells within one or more data sheets as discussed in the context of FIG. 5.

An existing expression may be removed from the EMS repository in response to a DeleteExpression request 624, and an ExpressionDeleted response message 626 may be sent after the removal is complete in the depicted embodiment. In some embodiments, the deletion of an expression record from an EMS, performed for example in response to a DeleteExpression request 624 received from a client, may not necessarily result in a modification of the data sheet referenced in the expression for which the record was created. In one embodiment, if and when a request to delete a data sheet (or some cells of a sheet) is received, e.g., at a sheets based data management service (SDMS), and the to-be-deleted cells or sheet are referenced in an expression record, the deletion request may be rejected, e.g., to prevent "dangling" expressions whose evaluation would result in an error.

In at least some embodiments, an EvaluateExpression request 628 may be submitted to obtain the value corresponding to an expression's formula, based on the current contents of the data sheet cells referenced in the formula. The evaluation request 628 may indicate, for example, the UUID of the expression and zero or more run-time parameters that may be used during the evaluation in various embodiments. The run-time parameters, if provided, may for example be used to filter or down-select the data sheet cells that are to be used to evaluate the expression on behalf of the client 601. A result of the evaluation, EvalResult 630, may be provided in response.

According to some embodiments in which a card-based application authoring technique of the kind introduced above in the context of the discussion of the card management subsystem 125 of FIG. 1 is used, results of evaluating a plurality of expressions corresponding to the layout items of a given card may be provided together by the EMS 691. For example, when an application user reaches a given layout screen of an executing instance of an application, a LoadCardExpressionSetValues request 633 may be submitted, with the ExprIDList parameter indicating a set of expressions to be evaluated for respective layout items of the card corresponding to the layout screen. Run time parameters included in the LoadCardExpressionSetValues may be used to personalize the expression evaluation, e.g., by filtering or down-selecting the set of data sheet cells whose values are used for evaluating one or more of the expressions based on the identity of the requesting client or other properties of the requester. In response, a FormattedResults message 635 comprising evaluated values corresponding to the expressions of the card may be provided in the depicted embodiment.

In some cases, as mentioned earlier, expressions may be used in card-based applications to perform writes or updates, instead of or in addition to be used to display values in the application screen layouts. A PerformExpressionBasedActions request 638 may be submitted in some embodiments, e.g., when a user enters a value into a data entry element of the application screen layout, and one or more expressions (indicated by their identifiers in the ExprIDList parameter) may be evaluated to determine the specific action to be taken (e.g., which particular row of a data sheet is to be modified/written). As in the case of the EvaluateExpression request and the LoadCardExpressionSetValues request, zero or more run time parameters may be included in the PerformExpressionBasedActions request, and used at the EMS 691 to personalize or customize the actions. An ActionsDone response 640 may be generated in some embodiments to indicate that the EMS has initiated or completed the requested actions based on the evaluation of the expressions.

In at least one embodiment, a ShowWriteTargetCells request 642 may be used to identify the cell or cells corresponding to the result of evaluating the formula of an expression that is used to determine where a data value entered by a user is to be written. For example, a client 601 (e.g., an application author) of the EMS 691 may wish to utilize the formula of an expression (identified by the ExprID parameter) to select a cell into which a data value entered by an application user is to be stored, and the ShowWriteTargetCells request 642 may be utilized to determine the coordinates of the cell that would be modified when a data value is entered, indicating the cell that would be affected as a result of the use of the expression within the application. The ShowWriteTargetCells request for an expression that is used for a write may be referred to as a request for a resolution of the expression. A TargetCellInfo response 644 may provide information about the targeted cell(s), including the coordinates of the targeted cell(s), in the depicted embodiment. In some embodiments, other combinations of expression-related programmatic interactions than those shown in FIG. 6 may be supported. In some embodiments in which programmatic requests such as those illustrated in FIG. 6 are supported by the EMS, e.g., via a set of APIs, a wide variety of applications may be built using persistent expression records. For example, in addition to or instead of mobile applications (applications with which end users interact via graphical or visual interfaces such as cell phone screens or tablet screens), audio-driven applications (e.g., where the users interact with applications via audio interfaces associated with voice-driven automated personal assistants), gesture-driven applications (in which for example hand gestures, head gestures and the like are used to interact with applications), virtual reality/augmented reality applications, workflow automation applications and the like may also utilize persistent expressions referencing data sheets in various embodiments.

Example Application Authoring Interface

Figure 7:
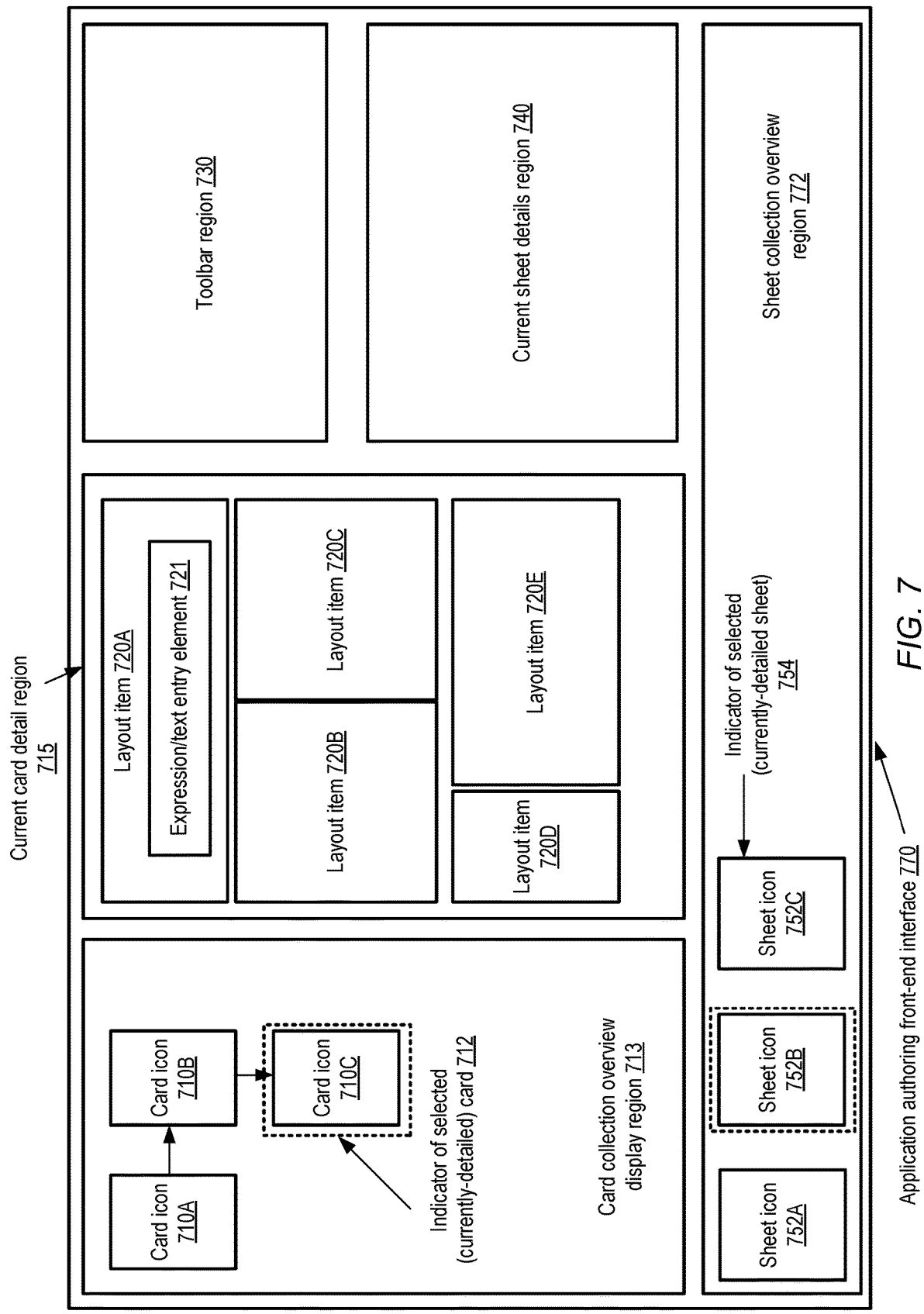
FIG. 7 illustrates an example application authoring interface in which data sheet-based expressions may be entered, according to at least some embodiments.

As mentioned earlier, in various embodiments, application authors/developers may define data sheet based expressions via programmatic authoring interfaces for applications modeled as a set of cards, in which individual cards correspond to respective application screen layouts (e.g., on a mobile phone or other mobile computing device). FIG. 7 illustrates an example application authoring interface in which data sheet-based expressions may be entered, according to at least some embodiments. The example interface 770 may be presented to an application author during a session of interaction, e.g., from a desktop-based front-end authoring tool, with a mobile application authoring and deployment service in the depicted embodiment. The presented information may be distributed among at least five regions in the depicted embodiment: a card collection overview display region 713, a current card detail region 715, a sheet collection overview region 770, a current sheet detail region 740, and one or more toolbar regions 730.

In region 713, icons 710 (e.g., 710A, 710B, and 710C) representing at least a subset of the collection of cards that have been created for a mobile application which is being developed or tested may be shown in the depicted embodiment. Arrows linking the card icons may, for example, show the flow of interactions experienced by an end user—e.g., a click on a layout item of card 710A by an application user may lead to a rendering of the layout of card 710B, and a click on a layout item of card 710B may lead to a rendering of the layout of card 710C in the depicted example. At any given point in time, details of one or more of the card collections may be shown in expanded view region 715, and the card(s) whose details are being displayed may be indicated using highlighting, a special color/font or some other indicator 712 in the card collection overview region in some embodiments.

Within the current card details region 715, various layout elements 720, such as 720A-720E, may be arranged and re-arranged as desired by the application author during the course of an editing session. Some layout items, such as 720A, may comprise expression or text entry elements 721 into which the application author may enter a formula and/or other properties of an expression which is (a) to be stored as a persistent first class object separate from the contents of the sheets whose cells are referenced in the formula and (b) utilized at application runtime to populate the layout item and/or to perform an operation based on input entered into the layout item by an end user. In some embodiments, an application author may indicate whether the text entered into an element 721 is to be saved as an independent expression object (e.g., within an expression definition record similar to the records 231 of FIG. 2) or not—e.g., special delimiters or a drop down menu item associated with element 721 may be used to indicate whether a persistent expression corresponding to the entered text is to be generated.

A variety of layout item types may be supported in different embodiments, such as rich text elements or containers, repeaters/iterators, calendar entries, charts/images, forms which may be used for data/formula entry, maps, contact entries, video clips and the like. Icons 752 (or tabs or other symbols), such as 752A-752C, representing individual data sheets whose contents may be referenced directly or via expressions in the application may be shown in sheets collection overview region 772 of interface 770 in the depicted embodiment. Details of a currently-viewed or currently-edited data sheet (for which a visual indicator 754 such as a highlight, a contrasting color or font may be used) may be provided in region 740 in the depicted embodiment. The toolbar region 730 may comprise a collection of tools which can be used by the application author to arrange and/or format the contents of the other regions in the depicted embodiment—e.g., tools may be used to add/modify/remove cards, add/modify/remove sheets, add/modify/remove layout elements, and the like in various embodiments. By including one or more sheets (e.g., selected from a collection of sheets of a data management service) in region 772 and/or 740, an application author may indicate that the application being authored relies on a data set stored in the sheets in the depicted embodiment; and by entering a formula that refers to cells of the sheets using the expression entry element 721, the application author may indicate the relationship between the application, the sheets based data set of the application and an independently stored expression. As such, the three types of services indicated in FIG. 1—the expressions management service, the sheets based data management service, and the application authoring and employment service—may all be utilized jointly using interface 770 in the depicted embodiment.

The positions, sizes, fonts, colors, and other properties of layout items 720, including their associations with data sheets of the sheet collection and/or associated expressions, may be modified using simple point-and-click and/or drag-and-drop interface elements in various embodiments, considerably simplifying the development of the mobile application. In at least some embodiments, no source code may have to be entered by an application developer in order to create a fairly sophisticated application. In at least one embodiment, in addition to using straightforward graphical interactions, application authors may provide source code for some features of their applications if desired—for example, a tool of toolbar region 730 may provide a source code editor, or may allow source code files to be uploaded by application authors. Expressions may be referenced in such source code, e.g., via their unique identifiers in various embodiments. In some embodiments, several different connectivity modes may be supported for application authoring—e.g., an online mode (in which updates entered via the application authoring interface are synchronously stored at a repository of the application authoring and deployment service), and an offline mode (in which updates entered via the interface are only saved to a local device that is not currently connected to the application authoring and deployment service, and synchronization with the service is deferred) may be supported. The current connectivity mode of the authoring tool may be displayed using a portion of interface 770 in at least some embodiments. In various embodiments, the synchronization status of the local version of the application (e.g., whether the local version of the application's artifacts are synchronized with a master version stored in a repository of the application authoring/deployment service) may also be indicated. The current card display region 715 may be considered one example of a WYSIWYG editing region in various embodiments, similar to WYSIWIG interface 215 shown in FIG. 2. In some embodiments, machine learning techniques may be used to automate at least part of the process of application authoring—e.g., at least an initial set of cards for an application may be generated via a machine learning model.

Example Sheets-Based Data Management Service

Figure 8:
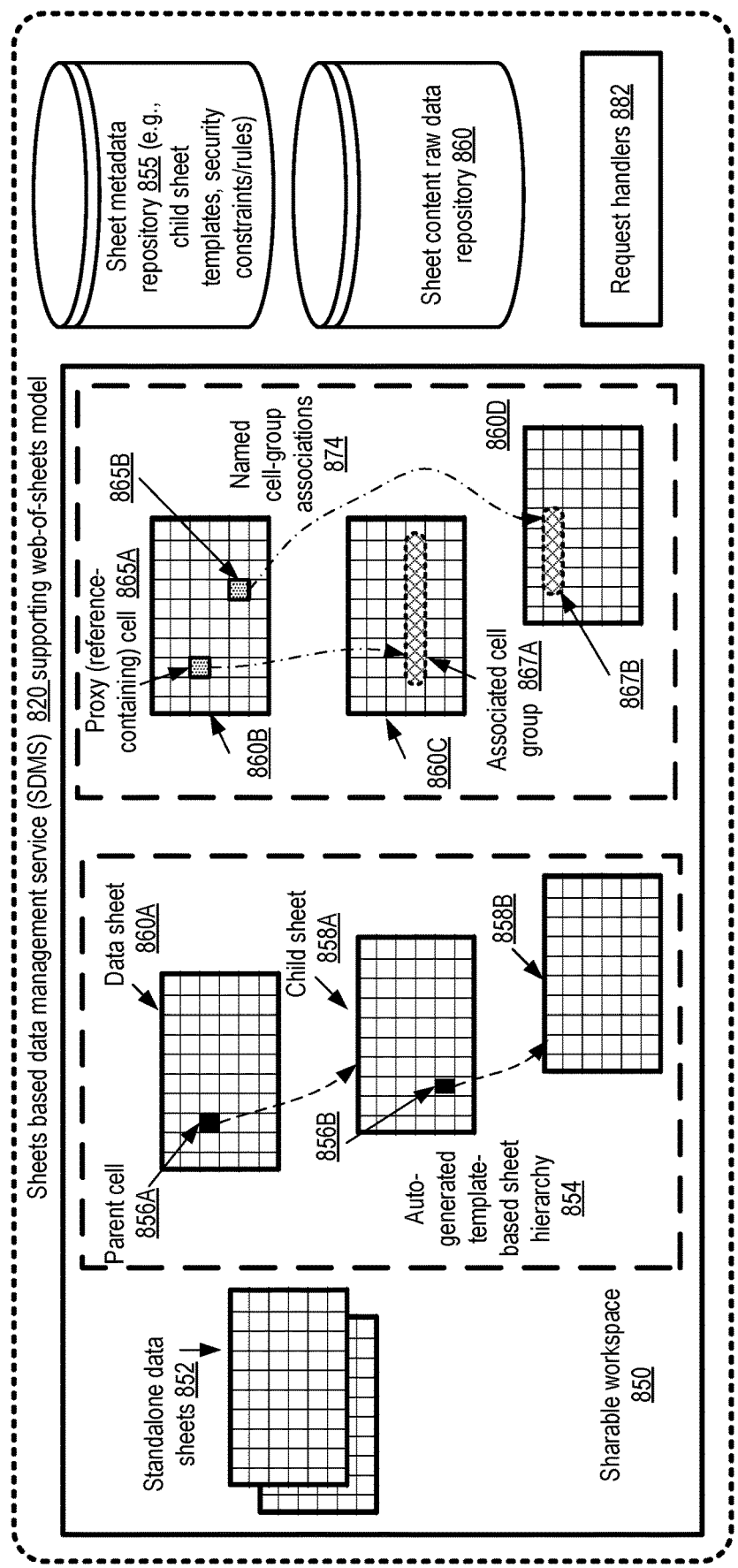
FIG. 8 illustrates an example sheets based data management service which may be utilized together with an expressions management service, according to at least some embodiments.

FIG. 8 illustrates an example sheets based data management service which may be utilized together with an expressions management service, according to at least some embodiments. The contents of various data sheets, together with associated metadata, may be stored in the sheets based data management service (SDMS), while records representing at least some expressions that refer to contents of the data sheets may be stored at a separate service in at least some embodiments. Other expressions may be stored as part of the data management service itself in at least some embodiments; that is, not all expressions that refer to data sheet cells may necessarily be managed at an independent expressions management service in such embodiments. As mentioned earlier, a given data sheet may comprise a grid of cells arranged in rows and columns; data sheets may also be referred to as worksheets in some embodiments. In one embodiment, collections of one or more data sheets may be referred to as workbooks, with respective worksheets being represented as files, and individual data sheets being accessed from within a workbook, for example, via tabs or similar interfaces.

One or more sharable workspaces 850 may be established on behalf of a given application author or SDMS client in the depicted embodiment, e.g., in response to requests submitted from a front end tool of an application authoring and deployment service, and/or a separate sheets-related tool, via programmatic interfaces. The requests may be received and handled by one or more request handlers 882 implemented at one or more computing devices in the depicted embodiment. The client on whose behalf a workspace is created (or other entities to whom the client delegates responsibilities) may be responsible for setting up permissions associated with sharing the workspace—e.g., read, write, modify, delete, and other permissions with respect to the workspace 850 or individual sheets may be granted to other clients as desired. In at least some embodiments, templates used to create child sheets may include some types of security-related properties as well.

A given workspace 850 may comprise, for example, one or more standalone data sheets 852 as well as at least two types of groups of logically related data sheets in the depicted embodiment. In accordance with a web-of-sheets data model of the SDMS, an auto-generated template-based sheet hierarchy, such as hierarchy 854, may be created on behalf of authorized clients or authors in some embodiments. In addition, named cell-group associations 874 may be generated and stored in some embodiments in accordance with the web-of-sheets model.

In at least one embodiment, a client may designate one or more cells of a given data sheet 860A, such as a column containing cell 856A, as parent cells. Such a designation may imply that if and when a new parent cell is added (or data is entered into a previously blank parent cell), one or more child sheets such as child sheet 858A is to be instantiated automatically by the SDMS 820 in the depicted embodiment. A sheet such as 860A containing one or more parent cells may be referred to as a parent sheet in some embodiments; note that a data sheet may be both a parent sheet and a child sheet in at least some embodiments. Child sheets may also be referred to as details sheets in one embodiments, as they may include supporting details about data that is summarized in the parent sheets. The properties of the child sheet may be specified by the client, e.g., by providing names and/or formulas for various cells of the child sheet, and/or by providing example cell contents for the child sheet which can be extrapolated/generalized by the SDMS. Properties of the child sheet may be stored in the form of persistent metadata objects called templates in some embodiments, which may be stored along with various other administrative information in a metadata repository 855.

Multi-level hierarchies of parent and child data sheets may be generated automatically based on templates in some embodiments—e.g., sheet 858A may be created as a child sheet of parent cell 856A of sheet 860A, sheet 858B may be created as a child sheet of parent cell 856B of sheet 858A, and so on. From a given parent sheet, multiple instances of multiple types of child sheets may be created in some embodiments; that is, branching may be supported in the hierarchy. Any desired type of content that can be represented using a grid of cells may be stored in a given sheet at any level of the hierarchy in various embodiments.

In at least some embodiments, a lazy or on-demand materialization strategy may be used for child sheets—e.g., while a new child sheet may be logically instantiated as soon as data is entered into a parent cell (or as soon as a new parent cell is created), the memory/storage to be used for data of the child sheet may not necessarily be allocated until the child sheet is accessed or navigated to. In effect, in various embodiments, when a parent cell is populated or created, this may initially be interpreted simply as an intent to create a child sheet, and the child sheet itself may be materialized or populated later, when an intent to display or to enter data into the child sheet is discerned. According to some embodiments, in response to one or more programmatic interactions, the SDMS may store a representation of a child template associated with a parent group of one or more cells of a first data sheet. For example, a logical table T1 with several columns C1, C2, C3, . . . , may be defined in a particular data sheet DS1 in one embodiment, and the cells of C1 may be designated as parent cells, such that whenever a new entry is added in row C1, a corresponding child data sheet with properties indicated in a child template CT1 is created automatically. In various embodiments, a logical table may comprise some number of rows and columns that are formatted and managed independently from other rows and columns of a data sheet. Properties indicated in a child template may, for example, include a name to be assigned to the child sheet, names of various rows and/or columns of the child sheet (or a child table T2 within the child sheet), formulas to be used to populate the cells of the child sheet, rules or constraints regarding the automatic propagation of data to/from the child sheet, and so on. For example, in one embodiment, a "copy-up" rule may allow data that is entered into a cell in a child sheet to be propagated to the parent data sheet (e.g., to update cells whose formula refers to data in the child sheet), while a "copy-down" rule may allow data that is entered into a cell in a parent data sheet to be propagated to a child sheet. In at least some embodiments, by default, until the user specifies the properties by providing examples or entering the properties into a form-like interface, a template may not necessarily contain any properties to begin with.

Rules regarding the accessibility of data among the sheets of a hierarchy may also be stored in the metadata repository 855 in at least some embodiments—e.g., such rules may indicate which portions of a child sheet are to be accessible from a parent sheet and vice versa, which updates to a child sheet are to be propagated to parent sheets and vice versa, etc. The raw data for various cells (e.g., data that is not computed and updated automatically based on values of other cells) may be stored in a separate repository 860 in the depicted embodiment. In at least some embodiments, for example, depending on the rules set up, when a value of a cell in a child data sheet (such as 858A or 858B) is modified, a corresponding child-dependent value may be updated in one or more parent sheets. In at least some embodiments, in accordance with the granted permissions, cells of a child sheet may be referred to using references to the parent cell of the child sheet. For example, if the parent cell is identified by a [row, column] combination [r1, c1], the contents of the cell in position [r2, c2] in the child sheet may be referenced using a notation similar to=[r1, c1] [r2, c2].

In addition to hierarchical relationships such as those between parent cells and child sheets, in at least some embodiments the SDMS 820 may enable the creation of logical associations between groups of cells and referring cells (which may also be termed proxy cells). For example, proxy cell 865A of sheet 860B may be associated with a cell group 867A of sheet 860C, while proxy cell 865B of sheet 860B may be associated with cell group 867B of sheet 860D in the depicted example scenario. In order to store persistent information about such associations, in the depicted embodiment a component of the SDMS 820 may generate a respective immutable or invariant object, such as a hidden key, representing the association between the proxy cell (e.g., 865A) and the group of associated cells (e.g. 867A). The object may be invariant in that the association may remain valid (and results obtained from formulas referring to the associated cells, expressed using the identifier of the proxy cell, may remain unchanged) regardless of whether the group of associated cells is moved around, e.g., as a result of sorting or other operations in sheet 860C or 860D. In at least one embodiment, when creating a logical association, the target group of cells with which a proxy cell is to be associated may be identified using a search interface. For example, to indicate that a search is to be conducted, a client may type in the first few letters or numerals of a value stored in the targeted group of cells, and the SDMS may indicate cells whose contents match the first few letters or numerals. The client may then pick one of the search results (and some number of adjacent cells) as the cell group for the proxy cell. In at least some embodiments, sheet based expressions managed at an expressions management service may be defined using such proxy-based logical associations, and/or may refer to cells that are part of template-based sheet hierarchies 854.

The displayed content of a proxy cell such as 860B (i.e., the content visible to users) may be derived from some combination of content of one or more cells of the referenced cells in some embodiments, e.g., based on a display formula or specification indicated by the client on whose behalf the association is created. Formulas that refer to the contents of the associated cells may be expressed via the proxy cell in some embodiments. For example, if one of the cells in a row of cells which form the associated cells contains a value for an "Age" column, and the proxy cell is at cell [r1, c1], in one implementation the age value from CG1 may be obtained using a notation similar to =[r1, c1][Age].

In at least some embodiments, parent cells and/or proxy cells may be distinguished from other cells within data sheets using, for example, a special symbol, font or color scheme. In one embodiment, a menu element (such as a drop-down menu option) may be employed by a client to designate that a particular cell is a parent cell or a proxy cell. The specific values/labels that are displayed within the parent cells and/or the proxy cells may be selected or specified by clients in some embodiments. In various embodiments, an expression for which a persistent record separate from referenced data sheets is created may refer to cells within any of the different types of sheets shown in FIG. 8, including parent sheets, child sheets, reference-containing sheets and/or sheets comprising associated cell groups.

In various embodiments, fairly complex relationships between various data elements or records may be established using hierarchical and group association features similar to those described above. For example, a hierarchy may comprise thousands of data sheets, and logical associations may potentially be created among large numbers of cells and cell groups. In some such embodiments, SDMS 820 may provide a summary visualization of the relationships within a given workspace, e.g., indicating how many sheets there are at various levels of the hierarchy, the association relationships that have been created for various groups of cells, and so on. Such a summary view may be provided, for example, in response to a programmatic query, and details of various parts of the web of sheets may be obtained in response to "zoom-in" requests and the like in some embodiments.

In addition to the core ability to easily model hierarchical relationships and permanent associations among cells, the web-of-sheets model may provide several additional practical benefits useful for collaborative application authoring in various embodiments. Respective security or access sharing settings may be set up for the different sheets in a workspace, for example, enabling a cleaner separation of rights and responsibilities among the appropriate set of collaborating application authors or other users than if the users/authors all had to share access to a single large data sheet. Locking of data at the cell level or row level, which may be inefficient and inconvenient for collaborating users, may not be required if the data is spread across a hierarchy or "network" of linked of sheets using the features of the web-of-sheets model.

The web-of-sheets model may also make it easier to parallelize at least some types of recalculation operations in at least some embodiments. Recalculation or "recalc" operations may be needed when, for example, the formulas for various cells of one or more sheets are defined in such a way that a change to a value in some set of cells triggers changes to the values in one or more other sets of cells, which may in turn result in updates to mobile applications deployed at various devices. The dependency trees for some recalculation operations may be fairly complex. As a result of distributing the data of an application among a hierarchy of sheets and/or linked sheets, it may become easier to perform some recalculations in parallel. Consider a scenario in which an application's data is distributed among a three-level hierarchy of sheets, L1, L2 and L3, such that some recalculation dependencies exist between the L3 and L2 levels and other recalculation dependencies exist between the L2 and L1 levels. Depending on the nature of the application, calculations involving dependencies among respective pairs of sheets at the L3 and L2 layers may be performed in parallel in such a scenario, and similarly, calculations involving dependencies among respective pairs of sheets at the L2 and L1 layers may be performed in parallel. As a result, the total time needed to perform a complex recalculation may be reduced. Note that recalculation-related efficiencies may also be obtained in various embodiments due to deferred evaluation of expressions as discussed earlier, such that at least some recalculations are deferred until the results are needed for a running instance of an application.

In contrast to at least some spreadsheet applications, in which some data sheets may only be reached by clicking on tabs, the web-of-sheets model may enable a more intuitive navigation method (similar to navigation among pages of the world-wide web) for accessing logically related sets of cells in various embodiments. For example, in at least some embodiments, a user or application author may navigate to a child sheet simply by clicking on a parent cell, and navigate back to the parent sheet if desired by clicking on a parent-proxy cell in the child sheet; clicking on tabs may not be required. Proxy cells may also be used to navigate among groups of cells which are not hierarchically related in various embodiments.

In at least some embodiments, a number of programmatic interfaces may be implemented by the SDMS 820, such as one or more web-based consoles, application programming interfaces (APIs), command-line tools, and/or graphical user interfaces that can be used to manage and interact with the workspaces and their data sheets. In at least one embodiment, one or more APIs may enable the bulk uploading or transfer of data into data sheets, e.g., from a stream of incoming data records or from legacy data stores.

In various embodiments, in addition to the support for hierarchical or association relationships, the SDMS 820 may also support the use of standalone data sheets or workbooks with common spreadsheet-like capabilities such as charts, data analysis tools such as sorts/pivot tables, and the like. That is, the hierarchical and logical association capabilities offered by the service need not be used by some clients for whose applications baseline spreadsheet capabilities are sufficient. Note that in some embodiments, records of expressions that refer to cells of data sheets that do not include the automatically-created hierarchies or logical associations of the web of sheets data model may be stored at an expressions management service—e.g., the expressions may refer to contents of standalone data sheets, and not necessarily to contents of sheet hierarchies 854 or sheets comprising named cell-group associations 874. In various embodiments, standalone data sheets may be combined, within a given workspace, with automatically-generated sheet hierarchies and/or sheets containing logical links to associated groups of cells.

Example Provider Network Environment

Figure 9:
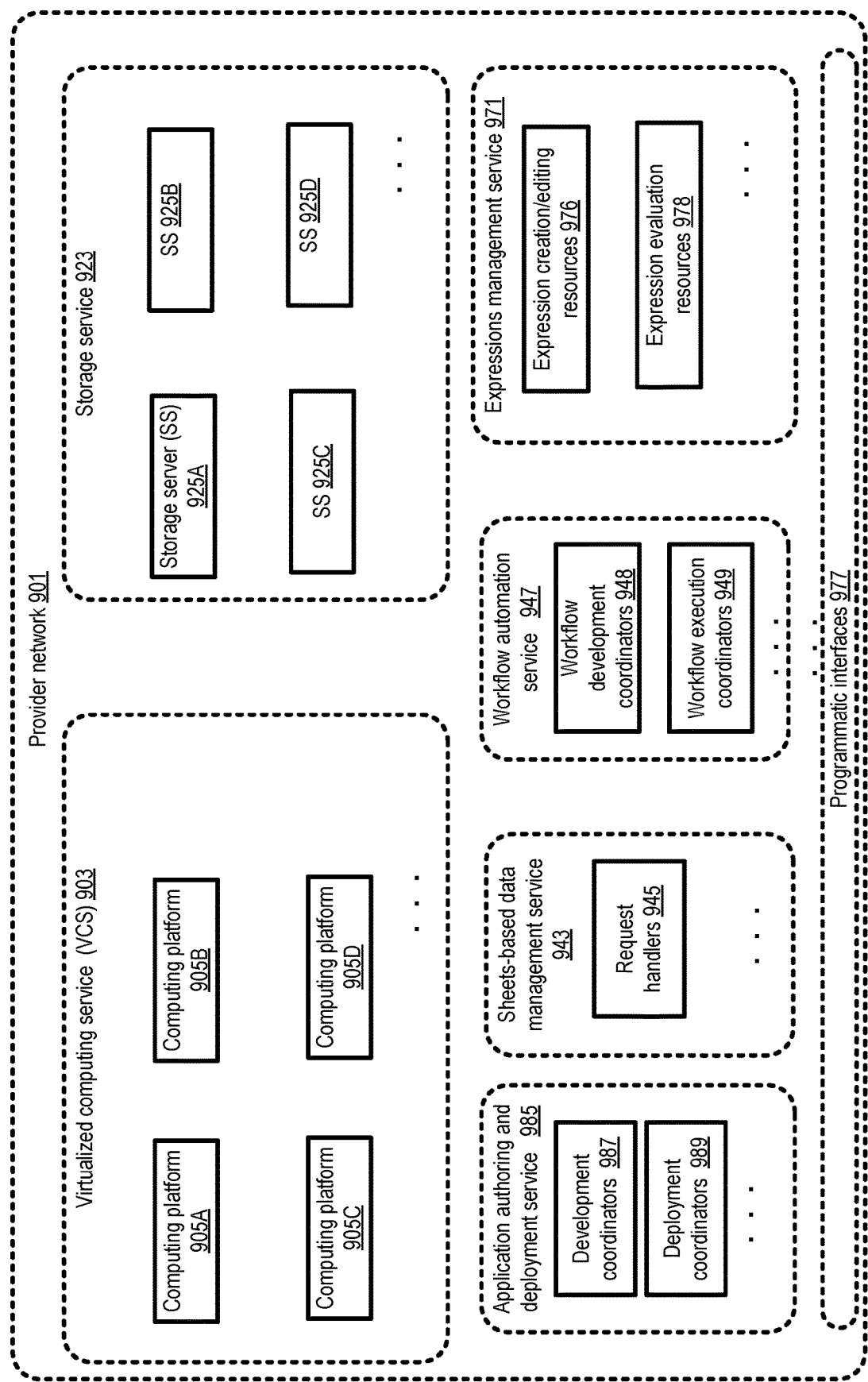
FIG. 9 illustrates an example provider network environment in which an expressions management service may be implemented, according to at least some embodiments.

As mentioned earlier, in some embodiments an expressions management service may be implemented as part of a provider network. FIG. 9 illustrates an example provider network environment in which an expressions management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtualized computing service 903, a storage service 923, an application authoring and deployment service 985, a sheets-based data management service 943, a workflow automation service 947, and an expressions management service 971. Each of the services may include a respective set of computing devices and/or other resources in some embodiments. Components of a given service may utilize components of other services in the depicted embodiment—e.g., computing platforms 905 (e.g., 905A-905D) of the virtualized computing service 903 and/or storage servers 925 (e.g., 925A-925D) of the storage service may be employed by various other services of provider network 901. Individual ones of the services shown in FIG. 9 may implement a respective set of programmatic interfaces 977 which can be used by external and/or internal clients (where the internal clients may comprise components of other services) in the depicted embodiment. In some embodiments, the sheets-based data management service 943, the application authoring and deployment service 985, and/or the expressions management service 971 may be implemented as respective subsystems of a combined higher-level service.

The expressions management service 971 (similar in functionality and features to EMS 140 of FIG. 1) may comprise a set of expression creation and editing resources 976 as well as a set of expression evaluation resources 978 in the depicted embodiment. Resources 976 may be used to generate and store expression definition records and associated metadata, for example, while resources 978 may be used to evaluate expressions on demand when required by running application instances as discussed earlier. As shown, the application authoring and deployment service 985 may comprise one or more development coordinators 987 and one or more deployment coordinators 989 in the depicted embodiment. The development coordinators 987 may be responsible for enabling the design and authoring of applications using interfaces similar to the application authoring interfaces described above, while the deployment coordinators 989 may be responsible for transmitting applications post-development to targeted mobile devices, loading and pre-fetching the appropriate subsets of data to the devices, and so on in various embodiments. The sheets-based data management service 943 may comprise, among other components, one or more request handlers 945 in the depicted embodiment. The request handlers 945 may respond to client-submitted requests, e.g., from the application authoring and deployment service 985, the expressions management service 971 or from other clients, enabling clients to create, populate, read, modify and delete various types of data sheets including sheets arranged in hierarchies and sheets with links to groups of cells as discussed earlier.

In some embodiments, a workflow automation service 947 may also utilize the expressions management service 971. Workflows for automating various tasks of an organization may be generated and stored with the help of workflow development coordinators 948, and decisions regarding the particular operations to be performed next may be made at various stages of individual workflows based on the results of evaluating sheets based expressions stored at the service 971. Workflow execution coordinators 949 may for example utilize expression evaluation resources 978 to obtain such results in various embodiments.

The storage service 923 and/or the VCS 903 may each provide high levels of availability, data durability, and failure resilience, enabling workloads associated with numerous concurrent sets of application authoring projects and workflow related projects that utilize data-sheet based expressions of the kind discussed earlier to be handled in various embodiments. In at least some embodiments, the applications developed at the service 985 may be used to invoke processes or operations from other services—e.g., when an end user interacts with a particular layout element of an application, a service request may be transmitted to one or more other services of the provider network. In one embodiment, in response to determining that a particular cell of a sheet associated with an application has been updated from an application execution platform, a process may be instantiated, updated or terminated at a provider network service other than the application authoring and deployment service itself.

In at least one embodiment, at least some of the techniques discussed above for authoring and deploying applications based on using expressions and/or a web-of-sheets data model may be accomplished using non-specialized computing platforms (e.g., virtual machines) of the virtualized computing service 903. In some embodiments, the techniques for authoring and deploying mobile applications may be implemented without acquiring resources of network-accessible services such as those shown in FIG. 9. For example, a standalone set of tools implemented at one or more computing devices which are not part of a network-accessible service may be used in some embodiments.

Figure 10:
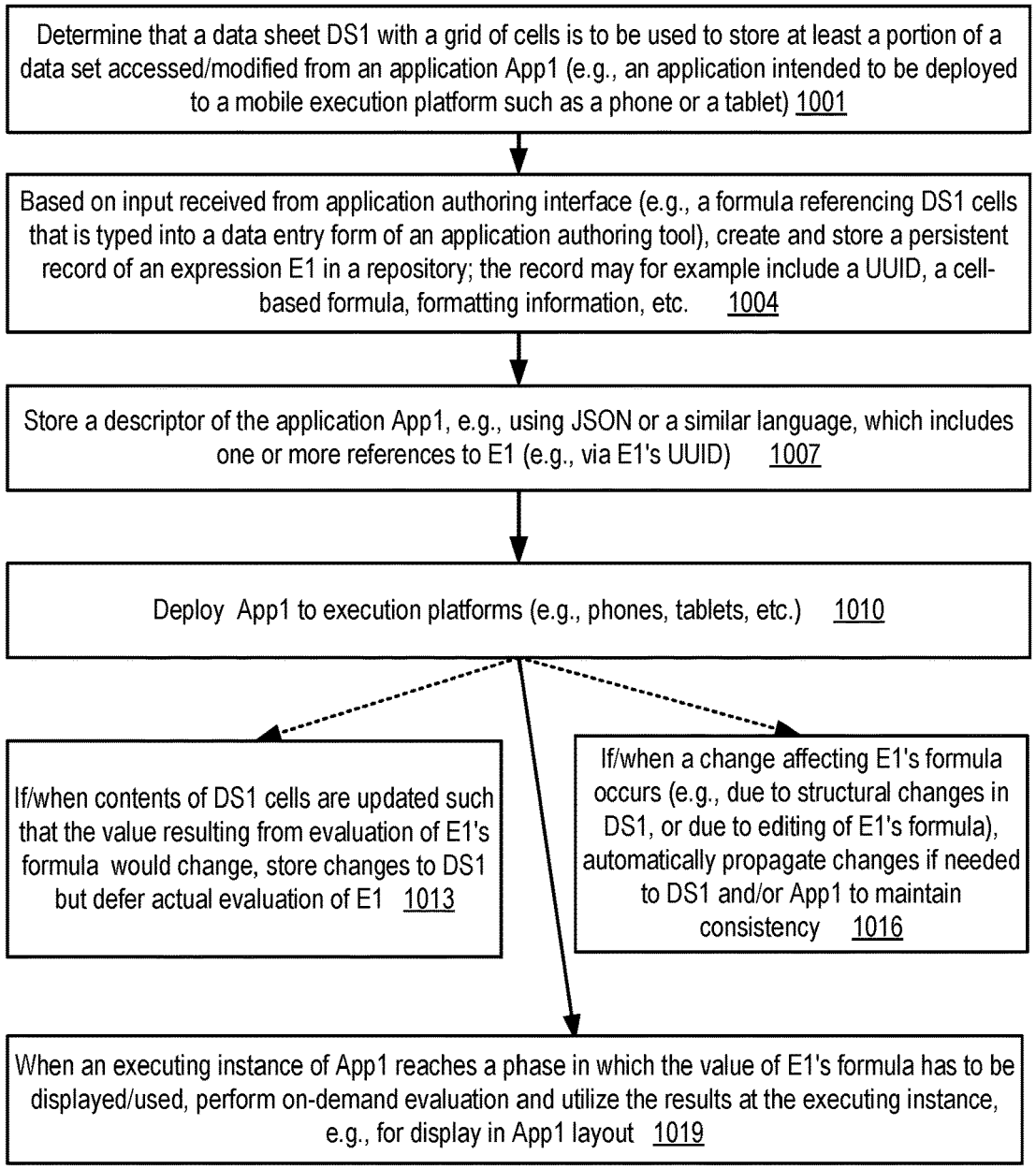
FIG. 10 is a flow diagram illustrating aspects of operations that may be performed to support development and execution of applications which utilize expressions whose records are stored in an expressions management service, according to at least some embodiments.

Methods for Storing and Utilizing Expressions Separately from Underlying Data Sheets FIG. 10 is a flow diagram illustrating aspects of operations that may be performed to support development and execution of applications which utilize expressions whose records are stored in an expressions management service, according to at least some embodiments. As shown in element 1001, a determination may be made that a data sheet DS1 comprising a two dimensional grid of cells is to be used to store a data set that is accessed/modified from an application App1 being developed (e.g., an application intended for deployment to a mobile execution platform such as a smart phone or a tablet, a workflow automation application, or some other type of application). In some embodiment, the fact that DS1 is to be used for App1's data may, for example, be indicated as a result of an application author selecting DS1 from among a set of application data sources (such as a collection of data sheets of a sheet based data management service, one or more database systems/services or the like) via an application authoring interface.

As shown in element 1004, a persistent representation or record of an expression E1 referencing one or more of DS1's cells may be generated and stored in a repository, e.g., based on input received via an application authoring interface in some embodiments. E1 may be referred to as a cell-based expression in such embodiments. In at least one embodiment, such a persistent record may be generated when an application author enters or types a formula expressed in terms of the cells into a data entry or text form of an application authoring tool. In another embodiment, the persistent record may be created when the application author utilizes a control element of the authoring interface (such as a drop-down option labeled "save as persistent expression" associated with a text entry form). In at least some embodiments, a resource of an expressions management service may verify whether a data sheet referenced in the typed-in formula exists and is accessible to the application author before storing the persistent record; in other embodiments, such verification operations may not be performed. In one embodiment, the fact that DS1 is to be used for App1 may be indicated as a result of the entry of a formula referring to DS1's cells indicated by the application author via the authoring interface—that is, a separate step of selecting or indicating DS1 may not be required before generation of the persistent record of E1. The contents of the persistent record may vary in different embodiments—for example, in some embodiments elements similar to those indicated in the expression definition record shown in FIG. 3, including a unique identifier of the expression, the formula of the expression, formatting information, access permissions etc. may be stored in the record. In at least some embodiments, the contents of DS1 may be stored in a different repository than the repository used for the persistent record of E1—e.g., a repository at a sheets based data management service (SDMS) similar in functionality to SDMS 130 of FIG. 1 may be used to store contents and/or metadata associated with DS1, while another repository at an expressions management service (EMS) similar in functionality to EMS 140 of FIG. 1 may be used for the persistent record of the expression E1. In some embodiments, a user-defined name for E1 (e.g., a name such as "AverageSalary") may be stored in E1's persistent record, e.g., based on input received programmatically at the time of the creation of the record or later.

A descriptor or persistent representation of the application App1 created via the application authoring interface, comprising one or more references to E1, may be stored in various embodiments (element 1007). For example, the references to E1 may be used to populate a field of one of the screen layouts of App1 in some embodiments (either by directly presenting the result of evaluating E1's formula, or by presenting a result of some function applied to E1's formula result), or to select an operation to be performed during a stage of App1's execution (such as determining which particular screen or layout element is to be displayed next, or storing a value in DS1). In some embodiments, JSON (JavaScript Object Notation) or a similar markup or scripting language (such as a language derived from Extended Markup Language or XML) may be employed to store the descriptor of App1, e.g., at a repository of an application authoring and deployment service (AADS) similar to AADS 120 of FIG. 1. In various embodiments, E1 may be referred to in the persistent representation of the application via its unique identifier, e.g., instead of using E1's formula which reveals the specific cells of DS1 that are accessed when E1 is evaluated. Note that at least in some embodiments, E1's formula may not necessarily be stored as part of DS1 contents—that is, a record of an expression may be stored and used in applications without necessarily being included in any of the cells of the data sheet being referenced in the expression.

At least one version of App1 may be deployed or propagated to one or more execution platforms (element 1010), such as cell phones, tablets and the like after the appropriate amount of application testing has been completed in various embodiments. During the authoring/testing phase as well as post deployment, if and when contents of DS1 cells are updated/written such that the value resulting from an evaluation of E1 (i.e., E1's formula's value) would change, the changes made to DS1 may be stored persistently (e.g., in the SDMS repository) in some embodiments, without re-evaluating E1 itself (element 1013). As such, the re-evaluation of E1 may be deferred until needed from a running instance of App1 (or any other application that uses E1) in such embodiments. In at least one embodiment, a staleness notification or indicator may be sent to execution platforms at which App1 is deployed or running when such changes occur at the underlying data sheets.

If/when a change affecting E1's formula occurs (e.g., due to structural changes such as addition/removal of rows/columns from DS1, or due to editing of E1's formula), the corresponding changes needed in the formula (such as changes to coordinates of one or more cells affected by a structural change) may be automatically determined and propagated as needed in various embodiments (element 1016). Such changes may for example, be propagated to various subcomponents of App1 or DS1 in which E1 is referenced, and/or stored in the persistent representation of E1 itself. As a result, App1 (and any other applications that may also utilize DS1) would continue to work as designed, avoiding application errors or failures that might otherwise result from incorrect or "dangling" references resulting from the changes. Note that in some cases, several cells of DS1 itself may refer to or use E1, and all such cells may be automatically updated when a modification request directed at E1 is received and processed in various embodiments. In at least some embodiments, one or more indexes may be maintained to keep track of the relationships between data sheets/cells, expressions, and applications—e.g., an index that indicates the particular cells of various data sheets in which E1 is referenced/used may be maintained, another index that indicates all the subcomponents of App1 or other applications in which E1 is used may be maintained, and so on.

When an executing instance of App1 reaches a phase/stage in which the value of E1's formula has to be used, e.g., for displaying content or for performing some other operation, an on-demand evaluation of E1's formula may be performed (element 1019), and the results may be utilized at the executing instance in various embodiments. Because the re-evaluation of E1 is deferred until needed, unnecessary re-evaluations may be avoided despite changes to the data sheet DS1, thereby saving on computational resources. In at least some embodiments, the use of E1 within App1 may be parameterized—for example, a programmatic request to run a portion of App1 in which E1 is used may include one or more parameters, and the parameters may be used to filter contents of DS1 used for evaluating E1. In one embodiment, for example, such a parameter may indicate the identity of the user on whose behalf App1 is being run, and the identity information may be used to mask out subsets of DS1 contents when dynamically evaluating E1's formula. Different sets of access permissions may be set for respective expressions (which may all be used within App1) in some embodiments, and the access permissions pertaining to individual expressions and users may be checked/verified when portions of App1 that access or use the expressions are reached on behalf of different users. Thus, for example, if a user U1 is allowed to view a result of evaluating E1 but not allowed to view a result of evaluating a second sheets-based expression E2, while another user U2 is allowed to view a result of E2 but not allowed to view the result of E1, the two users may have different user experiences when executing various phases of App1 in which E1 and E2 are used to generate output or select application operations to be performed next. In at least some embodiments, expressions such as E1 may be used not only to read portions of data sheets such as DS1, but also to update data sheets. For example, an expression E2 may also be used within App1 to select a particular cell of DS1 into which a value V1 entered by an App1 user at run-time (or some value derived from V1) is to be stored.

It is noted that in various embodiments, some of the operations shown in FIG. FIG. 10 may be implemented in a different order than that shown in the figure, or may be performed in parallel rather than sequentially. Additionally, some of the operations shown in FIG. 10 may not be required in one or more implementations.

Use Cases

The techniques described above, of supporting expressions as objects stored and managed independently of the data sheets referenced in the expressions, may be useful in a variety of scenarios. Numerous small business owners who are not experts in software development or traditional database techniques may for example be able to generate highly robust customized applications using such expressions, as updates to expressions resulting from changes to the underlying data sheets may be propagated automatically. The use of the familiar spreadsheet-like data sheets interfaces may considerably simplify the task of application authoring, while the isolation of the applications from the underlying data sheets via expressions as intermediary objects may help enhance data security. A large population of individuals and organizations may be able to develop and deploy mobile and other applications easily and securely, without having to write source code.

Illustrative Computer System

Figure 11:
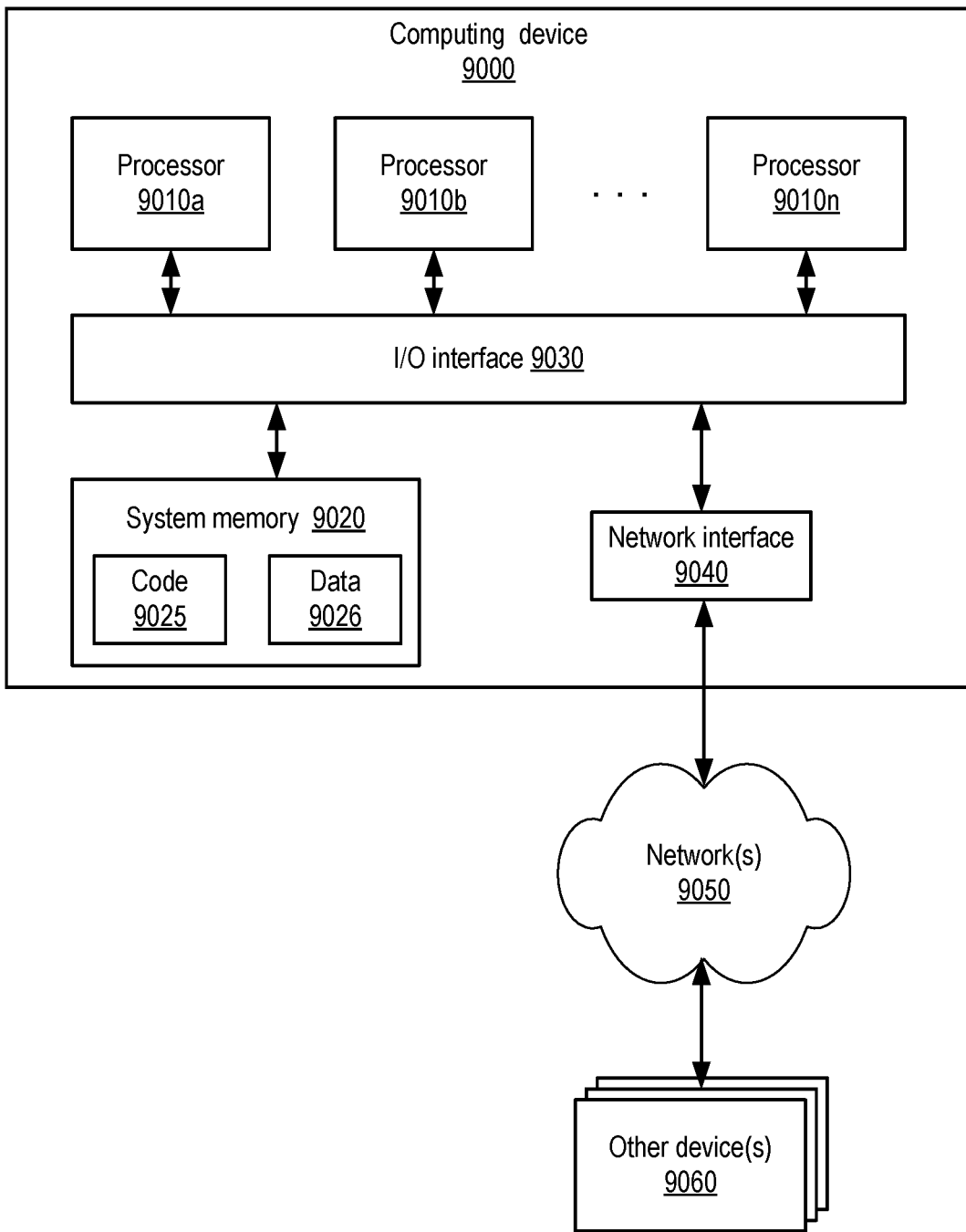
FIG. 11 is a block diagram illustrating an example computing device that may be used in at least some embodiments.

In at least some embodiments, a server that implements a portion or all of one or more of the technologies described herein, including the techniques for storing, evaluating and managing persistent records of expressions, authoring and deploying applications that use such expressions, creating and modifying cards, data sheets and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of one or more network-accessible services;
wherein the one or more computing devices include instructions that upon execution on or across one or more processors cause the one or more computing devices to:
store a persistent representation of a first cell-based expression in a first repository, wherein the first cell-based expression is indicated at least in part by input obtained via an application authoring interface configured for authoring applications, wherein the first cell-based expression refers to one or more cells of a data sheet comprising a two-dimensional grid of cells, wherein contents of the data sheet are stored in a second repository, and wherein the persistent representation comprises a unique identifier assigned to the first cell-based expression;
deploy an application of the applications, the application distinct from and at least partially developed via the application authoring interface, to one or more execution platforms, wherein the application is distinct from the first repository and the second repository and is based at least in part on the input obtained via the application authoring interface that is distinct from the application, wherein in the application, a screen layout is configured to display a value based on evaluating the first cell-based expression, wherein the application utilizes the unique identifier to indicate an association between the screen layout and the first cell-based expression, and wherein the application does not indicate cell coordinates of the one or more cells of the data sheet;
in response to detecting a write directed to a first cell of the one or more cells referenced in the first cell-based expression stored in the first repository distinct from the application, store modified contents of the first cell without re-evaluating the first cell-based expression; and
in response to a running instance of the application reaching an execution stage in which the value of the first cell-based expression is needed and based on use of the association between the screen layout and the first cell-based expression indicated by the unique identifier to identify the first cell-based expression,
(a) re-evaluate the first cell-based expression stored in the first repository using the modified contents of the first cell, and
(b) cause the value, based at least in part on the re-evaluation of the first cell-based expression, to be displayed in the screen layout associated with the first cell-based expression by the unique identifier.

2. The system as recited in claim 1, wherein the one or more computing devices include further instructions that upon execution on or across the one or more processors further cause the one or more computing devices to:
in response to detection of a structure modification of the data sheet, automatically update, in at least the persistent representation, coordinates of at least one cell referenced in the first cell-based expression.

3. The system as recited in claim 1, wherein the input obtained via the application authoring interface comprises a formula of the first cell-based expression, wherein the data sheet does not include the formula.

4. The system as recited in claim 1, wherein the one or more computing devices include further instructions that upon execution on or across the one or more processors further cause the one or more computing devices to:
in response to detecting the write, transmit a staleness indicator to an execution platform of the one or more execution platforms.

5. The system as recited in claim 1, wherein the one or more computing devices include further instructions that upon execution on or across the one or more processors further cause the one or more computing devices to:
store, in the first repository, (a) a first set of access permissions associated with the first cell-based expression and (b) a different set of access permissions associated with a second cell-based expression; and
verify, in response to an access request directed to an individual cell-based expression of the first and second cell-based expressions, that stored access permissions of the individual cell-based expression permit fulfillment of the request.

6. A method, comprising:
performing, at one or more computing devices:
storing a unique identifier of a first expression in a repository, wherein the first expression is indicated at least in part by input obtained via an application authoring interface for authoring applications, and wherein the first expression refers to one or more cells of a data sheet comprising a two-dimensional grid of cells;
generating an application of the applications, the application distinct from the repository and the application authoring interface, wherein in output corresponding to a portion of the application, a value based at least in part on the first expression is presented, wherein the application does not indicate cell coordinates of the one or more cells of the data sheet, and wherein the application utilizes the unique identifier to indicate an association between the output and the first expression;
in response to detecting a write directed to a first cell of the one or more cells referenced in the first expression, storing a modified version of contents of the first cell without re-evaluating the first expression; and
in response to the application reaching an execution stage in which the value based at least in part on the first expression is needed and based on use of the association between the output and the first expression indicated by the unique identifier to identify the first expression,
re-evaluating the first expression stored in the repository, and
causing the value, based at least in part on the re-evaluating of the first expression, to be presented in the output associated with the first expression by the unique identifier.

7. The method as recited in claim 6, further comprising:
receiving a request to run at least the portion of the application, wherein the request includes a value of a parameter of the first expression, and wherein re-evaluating the first expression comprises:
filtering contents of the data sheet based at least in part on the value of the parameter.

8. The method as recited in claim 6, further comprising performing, at the one or more computing devices:

storing, in the repository, a record representing a second expression obtained via the application authoring interface;

obtaining, during an execution of the application, a first data value entered via an interactive interface of the application; and storing a second data value in a particular cell of the data sheet, wherein the particular cell is selected based at least in part on the second expression, and wherein the second data value is based at least in part on the first data value.

9. The method as recited in claim 8, further comprising performing, at the one or more computing devices:

storing, in the repository, a data validation requirement associated with the second expression; and verifying, prior to storing the second data value, that the second data value does not violate the data validation requirements.

10. The method as recited in claim 8, further comprising performing, at the one or more computing devices:

providing, in response to a programmatic request to identify a target cell of the second expression, coordinates of the particular cell.

11. The method as recited in claim 8, further comprising performing, at the one or more computing devices:

storing, in the repository, an indication of one or more synchronization requirements associated with the second expression, including a data re-validation requirement; and in response to detecting a re-establishment of connectivity between an instance of the application and a network-accessible service, initiating at least one data re-validation operation corresponding to the data re-validation requirement.

12. The method as recited in claim 6, further comprising performing, at the one or more computing devices:

in response to a modification request associated with the first expression, automatically updating a plurality of cells of the data sheet, including (a) a first cell in which the first expression is referenced, and (b) a second cell in which the first expression is referenced.

13. The method as recited in claim 6, further comprising performing, at the one or more computing devices:

storing scope information pertaining to the expression in the repository, wherein the scope information comprises one or more of: (a) an identifier of the data sheet or (b) an identifier of a logical table within the data sheet, wherein the re-evaluating comprises utilizing the scope information to access the one or more cells.

14. The method as recited in claim 6, further comprising performing, at the one or more computing devices:

storing, in a record representing the first expression in the repository, a formatting specification for presenting a result of evaluating the first expression.

15. One or more non-transitory computer-accessible storage media storing program instructions that when executed on or across one or more processors cause one or more computer systems to:

store a unique identifier of a first expression in a repository, wherein the first expression is indicated at least in part by input obtained via an application authoring interface for authoring applications, and wherein the first expression refers to one or more cells of a data sheet comprising a two-dimensional grid of cells;

generate an application of the applications, the application distinct from the repository and the application authoring interface, wherein one or more operations of the application are based at least in part on a result of evaluating the first expression, wherein the application does not indicate cell coordinates of the one or more cells of the data sheet, and wherein the application utilizes the unique identifier to indicate an association between the one or more operations of the application and the first expression in response to detecting a write directed to a first cell of the one or more cells referenced in the first expression, store a modified version of contents of the first cell without re-evaluating the first expression; and in response to the application reaching an execution stage in which the result of evaluating the first expression is needed and based on use of the association between the one or more operations and the first expression indicated by the unique identifier to identify the first expression, re-evaluate the first expression stored in the repository, and cause the one or more operations, based at least in part on said re-evaluate the first expression, to be performed.

16. The one or more non-transitory computer-accessible storage media as recited in claim 15, further storing program instructions that when executed on or across the one or more processors further cause the one or more computer systems to:

store, in a record representing the first expression in the repository, a user-defined name of the expression, wherein the user-defined name is used to refer to the expression from at least a portion of the application.

17. The one or more non-transitory computer-accessible storage media as recited in claim 15, further storing program instructions that when executed on or across the one or more processors further cause the one or more computer systems to:

in response to a request received via a programmatic interface, provide an indication of one or more expressions referenced in the application, including the first expression.

18. The one or more non-transitory computer-accessible storage media as recited in claim 17, wherein a parameter of the request includes at least a portion of one or more of: (a) an application identifier of the application, (b) a user-defined name of the first expression, (c) the unique identifier, (d) one or more cell coordinates, or (e) one or more data sheet functions.

19. The one or more non-transitory computer-accessible storage media as recited in claim 15, wherein the application comprises one or more of: (a) a workflow application or (b) an application deployed at a mobile computing device or smart phone.

* * * * *